(12) United States Patent
Zacharias et al.

(10) Patent No.: US 11,190,624 B2
(45) Date of Patent: Nov. 30, 2021

(54) USER INTERFACE FOR JUST-IN-TIME IMAGE PROCESSING

(71) Applicant: Zebrafish Labs, Inc., San Francisco, CA (US)

(72) Inventors: Christopher Zacharias, San Francisco, CA (US); Jeremy Larkin, Concord, CA (US); David Birdsong, San Francisco, CA (US); John Angers, San Francisco, CA (US); Miguel A. Cardona, Jr., San Francisco, CA (US)

(73) Assignee: Zebrafish Labs, Inc., San Francisco, CA (US)

( * ) Notice: Subject to any disclaimer, the term of this patent is extended or adjusted under 35 U.S.C. 154(b) by 0 days.

(21) Appl. No.: 17/089,129

(22) Filed: Nov. 4, 2020

(65) Prior Publication Data
US 2021/0142542 A1    May 13, 2021

Related U.S. Application Data

(63) Continuation of application No. 15/474,357, filed on Mar. 30, 2017, now Pat. No. 10,863,000, which is a (Continued)

(51) Int. Cl.
*H04L 29/06* (2006.01)
*G06T 11/60* (2006.01)
(Continued)

(52) U.S. Cl.
CPC .......... *H04L 67/42* (2013.01); *G06F 3/04847* (2013.01); *G06F 9/451* (2018.02);
(Continued)

(58) Field of Classification Search
CPC ........ G06T 11/60; G06F 40/166; G06F 40/14; G06F 3/04847
See application file for complete search history.

(56) References Cited

U.S. PATENT DOCUMENTS 7,620,892 B2   11/2009   Rainero et al.
7,631,252 B2   12/2009   Hertzfeld et al.
(Continued)

FOREIGN PATENT DOCUMENTS

CN    102323917 A   1/2012
CN    103077088 A   5/2013
(Continued)

OTHER PUBLICATIONS

International Search Report and Written Opinion dated May 4, 2015, for International Application No. PCT/US2015/012310, 10 pages.
(Continued)

*Primary Examiner* — Seth A Silverman
(74) *Attorney, Agent, or Firm* — Perkins Coie LLP; Colin Fowler

(57) ABSTRACT

Technology is disclosed for an image editing tool that generates a recipe for just-in-time processing of images ("the technology"). Various embodiments of the technology include an image processing system that provides image processing services to a client system that publishes content including an image to end users. The image processing system processes the image based on a recipe to generate a processed image. The image editing tool is integrated into an application, e.g., webpage or a web browser, that displays the content. A user, e.g., administrator of the client system, can use the image editing tool to edit the image on the webpage and generate the recipe including instructions regarding the edits. The recipe is transmitted to the image processing system which processes the image based on the recipe, and transmits the processed image to the client system for further transmission to the end users accessing the content.

20 Claims, 20 Drawing Sheets

Related U.S. Application Data continuation of application No. 14/161,280, filed on Jan. 22, 2014, now Pat. No. 9,654,602.

(51) Int. Cl.
 *G06F 9/451* (2018.01)
 *G06F 40/166* (2020.01)
 *G06F 40/14* (2020.01)
 *G06F 3/0484* (2013.01)

(52) U.S. Cl.
 CPC ............ *G06F 40/14* (2020.01); *G06F 40/166* (2020.01); *G06T 11/60* (2013.01); *G06T 2200/16* (2013.01); *G06T 2200/24* (2013.01); *H04L 63/08* (2013.01)

(56) References Cited

U.S. PATENT DOCUMENTS

| | | |
|---|---|---|
| 7,809,802 B2 | 10/2010 | Lerman et al. |
| 8,319,781 B2 | 11/2012 | Westerhoff et al. |
| 8,370,732 B2 | 2/2013 | Black et al. |
| 8,509,569 B2 | 8/2013 | Weiss et al. |
| 8,856,281 B2 | 10/2014 | Van Der Merwe et al. |
| 8,954,487 B2 | 2/2015 | Jung et al. |
| 9,401,003 B2 | 7/2016 | Zacharias et al. |
| 2006/0026511 A1 | 2/2006 | Rainero et al. |
| 2007/0025381 A1 | 2/2007 | Feng et al. |
| 2008/0098301 A1 | 4/2008 | Black et al. |
| 2008/0209311 A1 | 8/2008 | Agronik et al. |
| 2009/0201303 A1 | 8/2009 | Westerhoff et al. |
| 2010/0211924 A1* | 8/2010 | Begel ............... G06F 16/9024 717/101 |
| 2010/0325191 A1 | 12/2010 | Jung et al. |
| 2011/0016419 A1 | 1/2011 | Grosz et al. |
| 2011/0227934 A1 | 9/2011 | Sharp |
| 2011/0231475 A1 | 9/2011 | Van et al. |
| 2013/0063472 A1* | 3/2013 | Marison ............. G06T 15/005 345/591 |
| 2013/0176319 A1 | 7/2013 | Westerhoff et al. |
| 2013/0187940 A1 | 7/2013 | Damez et al. |
| 2014/0050419 A1* | 2/2014 | Lerios ................ G06T 3/0056 382/276 |
| 2014/0072235 A1 | 3/2014 | Costantino et al. |
| 2015/0138219 A1 | 5/2015 | Zacharias et al. |
| 2015/0205500 A1 | 7/2015 | Zacharias et al. |

FOREIGN PATENT DOCUMENTS

| | | |
|---|---|---|
| JP | 2013031196 A | 2/2013 |
| KR | 1020100061583 A | 6/2010 |

OTHER PUBLICATIONS

International Search Report and Written Opinion dated May 7, 2015, for International Application No. PCT/US2014/066187, 7 pages.

\* cited by examiner

USER INTERFACE FOR JUST-IN-TIME IMAGE PROCESSING

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

CROSS-REFERENCE TO RELATED APPLICATION(S)

This application is a Continuation of U.S. patent application Ser. No. 15/474,357 entitled "USER INTERFACE FOR JUST-IN-TIME IMAGE PROCESSING," filed on Mar. 30, 2017, which is a Continuation of U.S. patent application Ser. No. 14/161,280 entitled "USER INTERFACE FOR JUST-IN-TIME IMAGE PROCESSING," filed on Jan. 22, 2014, issued as U.S. Pat. No. 9,654,602 on May 16, 2017, both of which are incorporated by reference herein in its entirety.

This application is related to U.S. application Ser. No. 14/083,166 titled "JUST-IN-TIME PROCESSING OF IMAGES" filed on Nov. 18, 2013, which is incorporated herein by reference in its entirety.

TECHNICAL FIELD

Several of the disclosed embodiments relate to image processing, and more particularly, to a user interface for generating instructions for just-in-time image processing.

BACKGROUND

Online publishers publish various content including text, image, video and audio. An online publisher may want to publish a particular image in various color schemes, patterns, layouts, etc. For example, an online art merchant may want to publish an image of a sculpture which was captured using a camera online. However, the merchant may want to enhance the image in a particular way before the image is published online to demand a buyer's attention. The merchant may want to generate multiple images showing specific portions of the sculpture.

Current publishing techniques typically require the merchant to generate a version of the particular image for each of the different ways the merchant wishes to publish the image. For example, if the merchant wishes to highlight only the portion of the image having the sculpture, the surrounding portions of the sculpture in the image may have to be blurred. In another example, if the merchant wishes to show how the sculpture looks in a particular decor, the surrounding portions of the sculpture in the image may also have to be shown. This requires the merchant to have different version of the images which serves different purposes. This can be a time consuming process since all versions have to be generated before they are published.

Further, the merchant may have to use a special image editing software to generate such images. The drawback of the current publishing techniques is that the merchant is expected to have image processing skills. Further, the process can also result in increased storage space for storing various versions of the particular image. As the number of images increase, or the versions of a particular image increase, a need arises for a robust version management system. All these factors can add to the maintenance costs for the merchant.

The problem increases by many folds if the image has to be rendered based on the device on which the buyer is viewing the image. Different devices can have different display sizes, form factors, resolutions, rendering techniques etc. Not only this requires the merchant to generate various versions of an image to suit the devices, it also requires the merchant to be aware of the devices available or to be available in the market. Further, in scenarios where certain images are not viewed by the buyers, the computing resources, such as processing time and storage space, for generating and storing such images are not utilized effectively.

DETAILED DESCRIPTION

Figure 1:
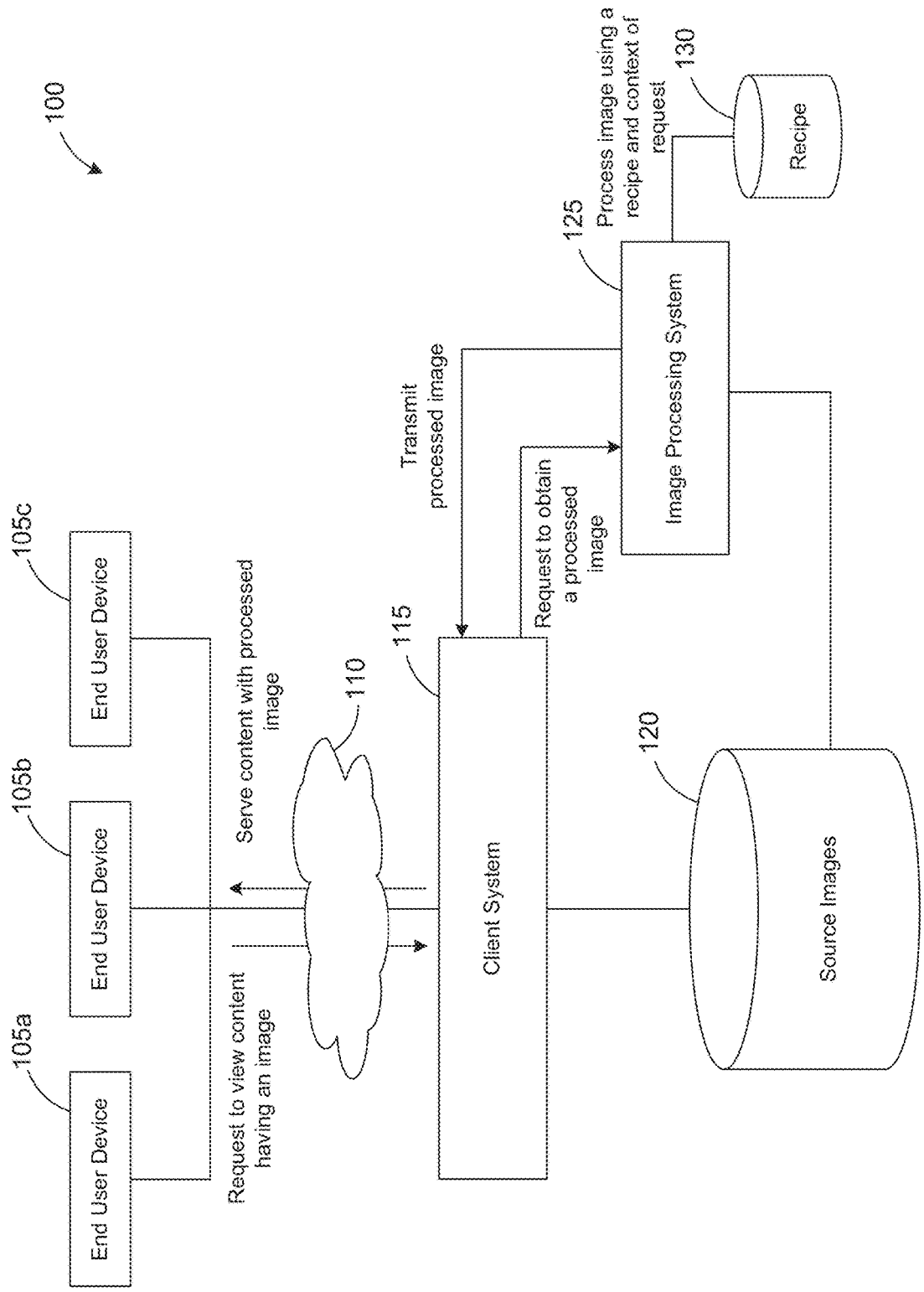
FIG. 1 illustrates an environment where an image processing system can be implemented.

Technology is disclosed for just-in-time processing of an image ("the technology"). Various embodiments of the technology include an image processing system for providing image processing services for clients who publish content, including a number of images, to end users. In some embodiments, processing an image includes executing a set of instructions (also referred to as a "recipe") on one or more original source images to render a processed image on the end user device. The recipe enables the processed images to be rendered on the end user device as per the preferences of a client system using the image processing system.

For example, the recipe can specify that the processed images be rendered in a particular size, color scheme, layout, resolution, etc. The recipe can also specify that a portion of the processed image be highlighted, cropped, a particular color be enhanced, etc. In some embodiments, the recipe may be provided, at least in part, by the client system. The recipe may also be generated, at least in part, by the image processing system. The image processing system enables the client system to obtain various processed images for a given single original source image. In some embodiments, more than one source image may be used to render the processed image.

In some embodiments, the image processing system processes the images upon receiving a request for retrieving the images associated with the content. That is, the image processing system processes the images just-in-time. For example, consider a client system that publishes online content, including images, to the end users using various means, including a website or an application (also known as an "app"). The end users access the content using various devices including a desktop, a laptop, a smartphone, a tablet etc. In some embodiments, when the end user accesses the client system for viewing the online content including images, the client system requests the image processing system to obtain processed images associated with the content. The image processing system processes the images and returns them to the client system which further serves the processed images to the requesting end user device.

In some embodiments, the images are also processed based on a context of the request. The context of the request can include data regarding attributes of the end user device, e.g., a resolution of display, a size of the display, a type of the end user device—a smartphone, tablet, laptop etc., an operating system on the end user device, ambient lighting, a network bandwidth available to the end user device etc. The image processing system renders the processed images based on the attributes of the device. For example, the images can be rendered in a particular resolution based on the resolution of the display of the display of the end user device. In another example, the brightness of the processed image may be adjusted based on the ambient lighting on the end user device. In some embodiments, the context of the request for obtaining the image is included in the request and/or provided by the client system.

In some embodiments, the image processing system can be implemented as a multi-tier architecture having various tiers of servers performing specific functions of the image processing system. Each of the tiers can have one or more servers. The image processing system can include a content delivery network having one or more tiers to receive a request for obtaining an image to be displayed at the end user device from a client system. The servers in the content delivery network can be spread across various geographical locations. The content delivery network receives the request from client systems in various geographical locations passes the request to a load balancing server tier if the processed images are not available at the content delivery network.

The load balancing server tier manages image processing requests from the client system by inserting them into a queue. The load balancing server tier receives the request from the content delivery network and inserts the request into the queue. An image processing server tier obtains an image processing request from the queue and generates a processed image. The processing includes retrieving one or more original source images and processing them based on the recipe and the context of the request to generate the processed image. The processed image is returned to the client system through the content delivery network and the client system further serves the processed image to the end user device.

In some embodiments, the image processing system also includes a source image server tier that is configured to obtain the original source images from a source location specified by the client system, and store them at a source image cache associated with the source image server tier. In some embodiments, the image processing system generates a log file containing data related to the processing of the one or more requested images. The image processing system also includes a prediction server that can predict the different processed images that may be requested by the end user devices in the future. In some embodiments, the prediction server can use various prediction techniques, including statistical analysis, to determine a set of processed images that may be requested in the future based, at least in part, on the data in the log file.

In some embodiments, the image processing system provides an image editing tool (hereinafter referred to as a "visor") that generates a recipe for on-demand processing of images. The visor includes a graphical user interface (GUI) that provides various editing controls for performing various editing operations on an image. The client system can use the visor to edit the image. The visor generates a set of image processing instructions corresponding to the editing operations performed by the client system and transmits the set of image processing instructions, which form a recipe for generating a processed image, to the image processing system. The image processing system processes the image based on the recipe and transmits the processed image to the client system which further serves the processed image to the end users accessing the image.

In some embodiments, the image can be part of the content published by the client system. For example, the image can be part of content published via a webpage. In some embodiments, the image processing system generates the visor on the same webpage as the content having the image. By generating the visor on the same webpage as the content, the client system can edit the image on the webpage and view the resulting image as it will be seen by an end user accessing the content. This can help the client system in obtaining a perspective on whether the edited image may be pleasing to the end users' eyes and in determining whether or not to publish the edited image.

Environment

FIG. 1 illustrates an environment where an image processing system can be implemented. The environment 100 includes a client system 115 that publishes content, including images, which can be accessed by end users using end user devices such as end user devices 105a-c via a communication network 110. The end user devices can include a smartphone, a laptop, a desktop, a tablet PC, or any other suitable device for viewing content. The environment 100 also includes an image processing system 125 that receives a request from the client system 115 (e.g., on behalf of an end user device such as end user device 105a) for obtaining a processed image (of a source image) which is served to the end user device 105a with the content. The image processing system 125 obtains the source image and processes the source image to generate a processed image (also referred to as "rendered image"). The processed image is then returned to the client system 115 which further serves the processed image to the end user device 105a.

The source image most often provides the base image data used in producing a processed image. In some embodiments, one or more source images may be used in generating the processed image. In some embodiments, the image processing system 125 obtains the source image from a location such as a source image storage system 120 specified by the client system 115 or from a cache associated with the image processing system 125 (not illustrated). The source image storage system 120 can be any type of storage system including a database, file storage and/or any other convenient or known storage techniques. Further, the source image storage system 120 can be part of the client system 115 or provided by any third party storage services, such as cloud storage from Dropbox, Amazon, Google, etc., where the client system 115 has stored the source images at.

The image processing system 125 processes the source image based on a recipe for the particular image and/or a context of the request. The recipe includes a set of instructions to be executed on the source image to generate the processed image. The recipe can include instructions regarding at least one of (a) a target size of the image to be rendered, (b) a target resolution of the image to be rendered, (c) a target color pattern of the image to be rendered, (d) a target layout of the image with respect to other content with which the image is served, (e) a target brightness value, (f) a target contrast value, (g) a target saturation value, (h) a target portion of the image to be highlighted, or (i) a target area of the image to be cropped etc.

In some embodiments, the recipe can be provided by the client system 115. For example, the client system 115 can provide a recipe which instructs the image processing system 125 to crop an image to include only a portion of the image having faces of certain subjects. In another example, the recipe can instruct the image processing system 125 to crop a specific portion of the image if the image is rendered on a smartphone, but include a larger portion of the image when it is rendered on a laptop. In another example, the recipe can instruct the image processing system 125 to change a color pattern of the image in order to match with a webpage with which the image is displayed or to highlight/enhance a particular color of the image to grab attention from the end user.

In some embodiments, the recipe can also be generated by the image processing system 125. For example, the image processing system 125 can determine based on historical data, which of the colors when enhanced in the image received more attention from the users (determined based on, e.g., a number of clicks) and enhance the color of the image and/or other images in the webpage accordingly.

The recipe can be stored in a storage system such as a recipe store 130. In some embodiments, the recipe store 130 can be implemented as various storage systems including a database, a file system and/or any other convenient or known storage techniques.

In some embodiments, the recipe can also be based on a context of the request. The context of the request can include an attribute of the end user device 105a, such as (a) a type of the end user device 105a, (b) a size of a display of the end user device 105a, (c) a resolution of the display of the end user device 105a, (d) an operating system of the end user device 105a, (e) ambient lighting of the end user device 105a etc. For example, if the end user device 105a has a display with resolution higher than a predefined resolution, then the recipe can instruct the image to be rendered in a resolution higher than a predefined resolution. In some embodiments, the image processing system 125 can have a predefined range of resolutions at which the processed image can be rendered. In another example, if the end user device 105a has a display with resolution lower than a predefined resolution, then the recipe can instruct the image to be rendered in low resolution. In another example, the brightness of the image can be changed based on the ambient lighting condition on the end user device 105a.

Further, in some embodiments, the context of the request can also include network bandwidth availability between the end user device 105a and the client system 115. For example, if the network bandwidth is below a predefined threshold, the recipe can instruct the image processing system 125 to render a low resolution image. The context of the request can be included in the request and/or provided by the client system 115 independent of the request.

In some embodiments, various recipes can be used to generate various processed images for a particular image. The client system 115 may provide access to at least one source image to the image processing system 125 and request the image processing system 125 to return one or more processed images for the source image. For example, for a given image by the client system 115, various processed images such as a high resolution image, a low resolution image, an image with a particular color enhanced, an image with a particular color scheme, brightness, saturation or hue etc. can be generated using the corresponding recipe. In some embodiments, a given recipe can be reused for processing various images. For example, a default recipe can process one or more images. The default recipe can be for enhancing the colors, brightness, saturation, etc. of the one or more images.

The image processing system 125 enables the client system 115 to obtain various processed images for a given single image. This minimizes the resources required for maintaining various versions of the images by the client system 115. However, in some embodiments, more than one source image may be used to render a processed image, for example, a derivative image. A derivative image is a kind of rendered image that depends on one or more original source images. For example, an image of a logo may be superimposed onto another image to obtain the derivative image. In embodiments where the image processing system 125 renders a derivative image, the image processing system 125 may retrieve the necessary original source images from the source image storage system 120.

The content published by the client system 115 can include text, video, audio, or any other multi-media content.

The content can be published in many ways, including websites, applications (also known as "apps"). The content can be accessed by the end users in a number of ways, e.g., via web browsers, or apps which when executed on an end user device display the content.

In some embodiments, the image processing system 125 can be implemented as a multi-tier architecture having various tiers of servers performing specific functions of the image processing system 125. One such example multi-tier implementation of the image processing system 125 is illustrated in FIG. 2.

Figure 2:
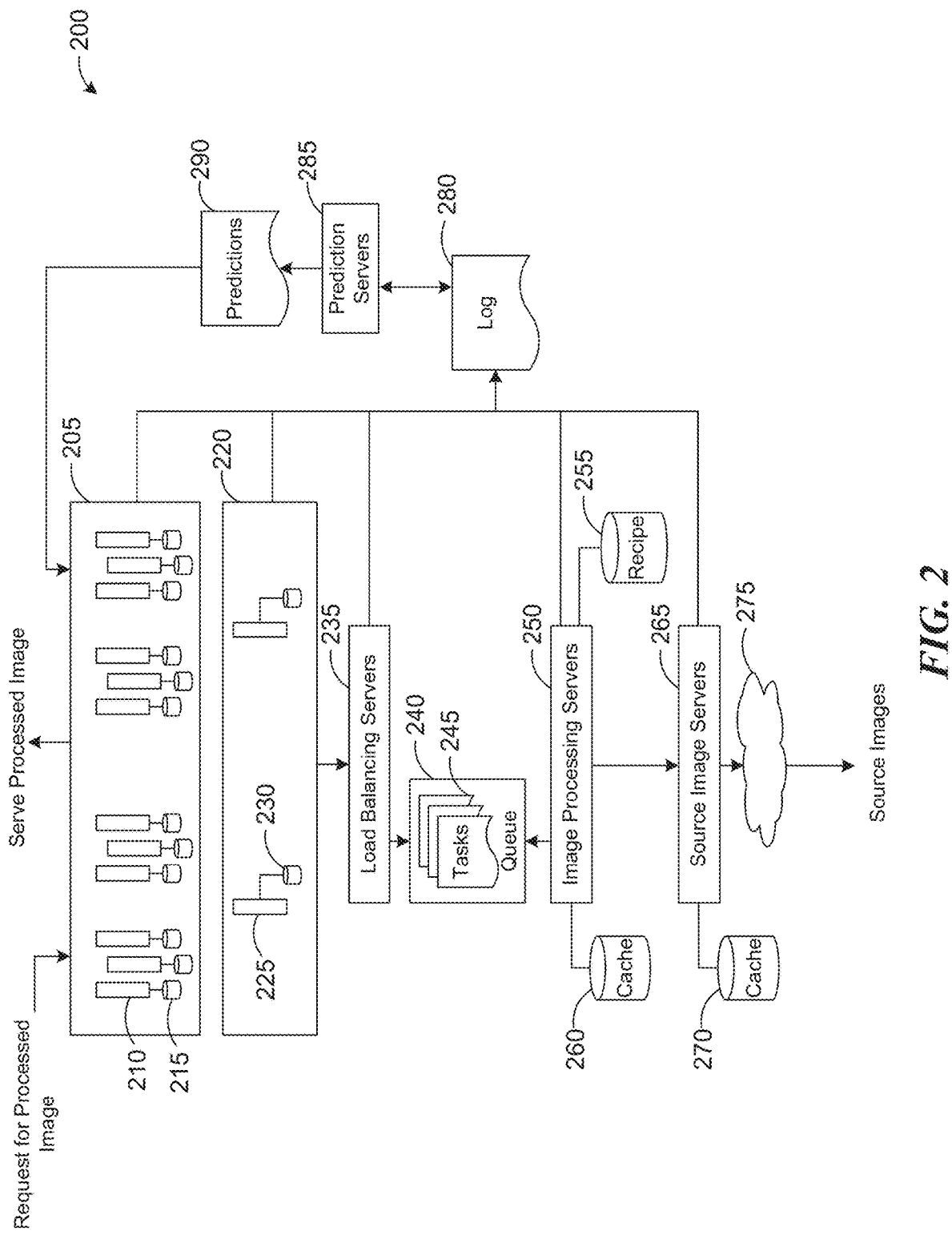
FIG. 2 illustrates a block diagram of an image processing system implemented as multi-tier architecture, consistent with various embodiments of the disclosed technology.

FIG. 2 illustrates a block diagram of an image processing system 200 implemented as a multi-tier architecture, consistent with various embodiments. The image processing system 200 includes various server tiers such as edge server tier 205, a shield server tier 220, load balancing server tier 235, an image processing server tier 250 and a source image server tier 265. In some embodiments, the image processing system 200 may be similar to the image processing system 125 of FIG. 1, and can be implemented in the environment 100.

Each of the tiers can have one or more servers. A server can be either a physical computer in a data center, or a virtual instance of a computer in cloud infrastructure. A server typically receives requests for work, performs or distributes the work, and then returns a response. The edge server tier 205 can receive requests from a client system such as client system 115 (e.g., on behalf of an end user) for obtaining processed images. For example, when the end user accesses the content published by the client system 115, which includes the processed image, the edge server tier 205 receives the request from the client system 115 to obtain the processed image. The edge server tier 205 includes multiple servers, such as edge server 210, and one or more associated caches, such as edge cache 215. In some embodiments, each of the edge servers in the edge server tier 205 has an associated edge cache as illustrated in FIG. 2. However, in some embodiments, the edge cache 215 may be associated with more than one edge server.

In some embodiments, the edge servers in the edge server tier 205 may be located in various geographical locations. The edge servers may be configured to serve requests from predefined geographical locations. When a request arrives at the edge server tier 205 from a client system, the request is routed to an edge server that is configured to serve the geographical location in which the particular client system is located. For example, while edge server 210 may be configured to serve requests from geographical locations A, B and C, another edge server may be configured to serve requests from geographical locations X, Y, and another edge server may be configured to serve requests from geographical location Z. That is, the edge servers in the edge server tier 205 act as a closest point of contact of the image processing system 200 for the client systems.

When a request is received at the edge server tier 205 from the client system 115 at a geographical location A, the edge server 210 checks whether the edge cache 215 has the processed image. If the edge cache 215 has the processed image, the edge server 210 serves the processed image to the client system 115, which further serves the processed image to the end user's device, such as end user device 105*a*. If the edge cache 215 does not contain the processed image, the edge server tier 205 passes the request to the shield server tier 220.

The shield server tier 220 includes multiple servers, such as shield server 225, and associated shield cache 230. In some embodiments, the shield servers in the shield server tier 220 can be distributed across various geographical regions. In some embodiments, a geographical region includes a number of geographical locations. The shield servers can be configured to receive requests from a group of edge servers in a particular geographical region. In some embodiments, the shield server tier 220 can have a shield server for every "x" number of edge servers, where "x" is a number configurable by a user, such as an administrator of the image processing system 200. The shield cache 230 can be associated with one or more shield servers, and the shield server tier 220 can have one or more shield caches.

When a shield server, such as shield server 225, receives the request from an edge server, such as edge server 210, the shield server 225 determines whether the shield cache 230 contains the processed image. If the shield cache can contains the processed image, the shield server 225 obtains the processed image from the shield cache 230 and returns the image to the edge server 210 which further serves the processed image to the client system 115. If the shield cache 230 does not contain the processed image, the shield server 225 passes the request to the load balancing server tier 235.

In some embodiments, the edge server tier 205 can bypass the shield server tier 220 and pass the request to the load balancing server tier 235 directly if the processed image is not available at the edge cache 215. However, typically, the edge server tier 205 determines whether the processed image is available at the shield server tier 220 before the request is passed to the load balancing server tier 235. In some embodiments, the time consumed for the determination, by the edge server, of whether a shield server contains the processed image is not significant because the edge server and the shield server can share the same communication network.

The load balancing server tier 235 receives the image processing requests 245 from the edge server tier 205 and/or shield server tier 220 and inserts them into a queue 240. An image processing server of the image processing server tier 250 fetches a request from the queue 240 and processes the request to generate a processed image. In some embodiments, the load balancing server tier 235 balances a load of the image processing system 200 by inserting the requests into the queue 240 and not assigning them directly to the image processing servers in the image processing server tier 250 upon receipt of a request at the load balancing server tier 235. The image processing server can pick up a request from the queue 240 when the image processing server is available to process a request.

In some embodiments, the load balancing server tier 235 determines whether a particular request is a valid request for an image before inserting the request into the queue 240. In some embodiments, the validity of the request can be determined by determining whether a signature of an image for which the request is received matches with the any of the signatures maintained at the image processing system 200. If the particular request is valid, the load balancing server tier 235 inserts it into the queue 240.

The image processing server tier 250 obtains an image processing request (also referred to as "a task") for a particular image from the queue 240 and processes the particular image based on a recipe for the particular image and the context of the request. The image processing server tier 250 determines whether the particular image, that is, an original source image provided by the client system 115 is available at the image processing server cache 260. If the original source image is available at the image processing server cache 260, the image processing server tier 250 obtains the image from the image processing server cache 260 and processes the original source image to generate the processed image. If the original source image is not available at the image processing server cache 260, the image processing server cache 250 requests the source image server tier 265 to obtain the original source image. The source image server tier 265 obtains the original source image and returns it to the image processing server tier 250 for processing the original source image. The image processing server tier 250 may store the received original source image at the image processing server cache 260.

In some embodiments, the source image server tier 265 obtains the original source image from a location specified by the client system 115, for example, at storage such as the source image storage system 120. The source image server tier 265 obtains the original source image from the source image storage system 120 via a communication network 275 and returns the original source image to the image processing server tier 250. The source image server tier 265 can also store the retrieved original source image at the source image cache 270. In some embodiments, obtaining the original source image from the source image storage system 120 can consume significant amount of computing resources, especially in cases where the source image storage system 120 is implemented as cloud storage service, for a number of reasons including performing authentication operations, performing read operations from a slow storage medium such as a hard drive etc. Accordingly, in order to minimize the consumption of computing resources, the original source image retrieved by the source image server tier 265 may be stored at the source image cache 270.

Also, in some embodiments, the source image server tier 265 may, regardless of whether a request is received for obtaining a particular original source image, pre-fetch the original images from the source image storage system 120 and store the original source images in the source image cache 270. The pre-fetching may be performed based on a predefined condition, for example, at a particular time of the day, day of the week, etc., or when the load on the image processing system 200 is below a predefined threshold. In some embodiments, the pre-fetching may help the source image server tier 265 to minimize the delay caused due to obtaining a particular source image from the source image storage system 120, in serving a request for the particular original source image from the image processing server tier 250. The source image server tier 265 may refresh the source image cache 270, that is, add or delete original source images from the source image cache 270 based on pre-defined cache management policies.

Referring back to the image processing server tier 250, after obtaining the original source image, either from the image processing server cache 260 or from the source image server tier 265, the image processing server tier 250 identifies a recipe for the original source image and processes the original source image using the recipe and a context of the image processing request to generate a processed image. The recipe can be identified using various data including information regarding the client, the content being published (e.g., based on URL of a webpage of the content), information regarding attributes of an end user device from which the request is initiated etc. Any necessary information for determining the recipe for processing the original source image is provided to the image processing system 200, for example, via the request. In some embodiments, the information for determining the recipe may be provided by the client system 115 to the image processing system 200 independent of the request.

The recipe can be provided by the client and/or generated by the image processing system 200. The recipes can be stored at a storage system such as recipe storage system 255. In some embodiments, the recipe storage system 255 can be implemented as various storage systems, for example, a database, a file system and/or any other convenient or known storage techniques.

The recipe includes a set of instructions to be executed on the original source image to render a processed image. The recipe can include instructions regarding at least one of (a) a target size of the image to be rendered, (b) a target resolution of the image to be rendered, (c) a target color pattern of the image to be rendered, (d) a target layout of the image with respect to other content with which the image is served, (e) a target brightness value of the image to be rendered, (f) a target contrast value of the image to be rendered, (g) a target saturation value of the image to be rendered, (h) a target portion of the image to be highlighted, or (i) a target area of the image to be cropped etc.

In some embodiments, the recipe can also be based on a context of the request. The context of the request can include an attribute of the end user device 105a. The attribute of the end user device 105a can include at least one of (a) a type of the end user device 105a, (b) a size of a display of the end user device 105a, (c) a resolution of the display of the end user device 105a, (d) an operating system of the end user device 105a, or (e) ambient lighting of the end user device 105a etc. In some embodiments, the recipe can be determined based on the context of the request. For example, if the end user device 105a has a display with a resolution higher than a predefined resolution, then the recipe can include instructions to render the image in high resolution. In another example, if the end user device 105a has a display with resolution lower than a predefined resolution, then the recipe can include instructions to render the image in low resolution. In another example, the brightness of the image can be changed based on the ambient lighting condition on the end user device 105a.

Further, in some embodiments, the context of the request can also include network bandwidth availability between the end user device 105a and the client system 115. For example, if the network bandwidth is below a predefined threshold, the recipe can include instructions to render a low resolution image.

After the original image is processed based on the recipe and the context of the request, the processed image is returned to the client system 115 which further serves the processed image to the end user device 105a.

In some embodiments, when the image processing server tier 250 returns the processed image to the client system 115, the processed image is transmitted to the client system 115 though one or more tiers, e.g., load balancing server tier 235, shield server tier 220 and edge server tier 205, above the image processing server tier 250. The one or more tiers may also store the received processed image in a cache associated with the corresponding server tier.

In some embodiments, the image processing server tier 250 can include different servers for performing different parts of processing the image. For example, tasks such as face recognition can be performed by a set of servers, changing a color scheme of a specific portion can be performed by another set of servers, cropping can be performed by another set of servers etc. The image processing server tier 250 can have logic, either in software, hardware, firmware or a combination, to assign a particular image processing operation to a particular server in the image processing server tier 250.

Further, in some embodiments, a particular image processing request can be split into a number of sub-tasks. For example, if a particular request requires face recognition and cropping, the face recognition operation and the cropping operation can be split into two tasks and added to the queue 240 as two sub-tasks. The face recognition task can be assigned to a server that performs face recognition task and the cropping task can be assigned to a server that performs the cropping operation. The final processed image can be rendered by combining the results of the sub-tasks or having each successive task work on the image resulting from the previous sub-task until all the sub-tasks are completed.

In some embodiments, one or more tiers of the image processing system 200 generate log 280 containing information at least regarding image processing requests and the image processing operations performed on the images. The log 280 can include information such as whether a particular processed image was available in a cache associated with a particular tier or was retrieved from a cache associated with a tier below the particular tier; performance metrics on rendering the processed image, e.g., time taken to render the processed image, memory consumed, a size of the original source image, how many source images were used to generate the processed image, time taken to load, wait or convert a particular image, a total response time in serving the processed image to the client system 115, response time of each tier, average time a particular task was in the queue 240, a number of tasks waiting in the queue at a given point of time, a point in time when the maximum queue size was reached, a time when evicting queue items were started etc.

In some embodiments, each of the one or more tiers can generate the log 280 separately. In some embodiments, the one or more tiers can generate information into a single log file 280. The log 280 includes information to identify which of the tiers generated particular information in the log 280. In some embodiments, the image processing system 200 may use a logging system (not illustrated), e.g., real-time logging systems, to generate the log 280. The logging system can be provided by a third party.

In some embodiments, the information in the log 280 can be analyzed and used to enhance the performance of the image processing system 200. In some embodiments, the information in the log 280 can be used to predict image processing requests that may be received in the future and pre-render the processed images in advance. The pre-rendered images may be stored at a cache, such as edge server cache 215. When a predicted request is actually received at the edge server tier 205, the edge server 210 may obtain the processed image from the edge server cache 215 and return the processed image to the client system 115. By predicting the requests, processing the predicted request to rendered the processed image and storing the processed image at the cache in advance of receiving the actual request, the time consumed in obtaining the processed image when the actual request is received is minimized significantly. This enhances the user experience of the end user since the end user experiences minimum to near zero delay in the processed image being rendered on the end user device 105a.

In some embodiments, the image processing system 200 includes prediction servers 285 that generate predictions 290 having information regarding future image processing requests. The predictions 290 are input to the image processing system 200 via the edge server tier 205 (similar to the image processing requests from client system 115) which renders the processed images based on the predictions 290. In some embodiments, the image processing system 200 may schedule rendering of the processed images for the predictions 290 based on a predefined criterion. For example, image processing system 200 may decide to render the processed images for the predictions 290 when a load on the image processing system 200 is below a predefined threshold, at a particular time of the day, a particular time of the week, when a predefined number of requests have been received from a particular client system, etc.

The prediction servers 285 can generate the predictions 290 based on the information in the log 280 using various known prediction techniques. For example, the predictions 290 can be generated based on a statistical analysis of the information in the log 280. In another example, the prediction servers 285 can employ an expert system or a rule engine that can help in generating the predictions 290 based on the information in the log 280.

In some embodiments, one or more tiers of the image processing system 200 can be owned or operated by different entities. That is, the image processing system 200 can be a combination of various infrastructure provided by different entities.

Figure 3:
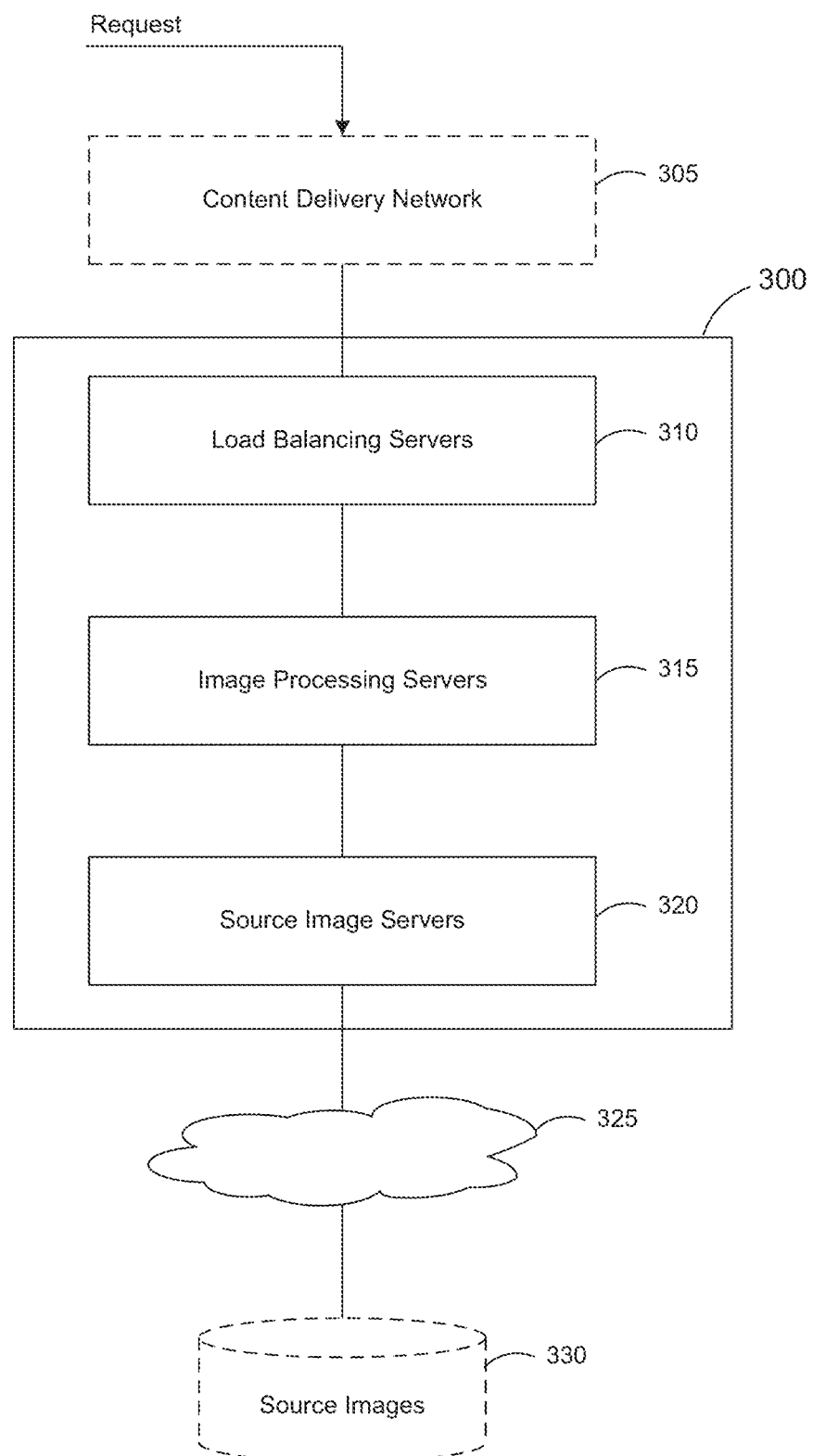
FIG. 3 illustrates a block diagram of an example implementation of an image processing system having infrastructure from various entities, consistent with various embodiments of the disclosed technology.

FIG. 3 illustrates a block diagram of an example implementation of an image processing system 300 having infrastructure from various entities, consistent with various embodiments of the disclosed technology. The example implementation includes a content delivery network (CDN) 305 that is designed to help position content, including processed images, around the world as close to the clients consuming it as possible.

In some embodiments, the CDN 305 can be a large distributed system of servers deployed in multiple data centers across the Internet. The goal of CDN 305 can be to serve content to end-users with high availability and high performance. The CDNs serve content, including web objects (text, graphics and scripts), downloadable objects (media files, software, documents), applications (e-commerce, portals), live streaming media, on-demand streaming media, and social networks.

In some embodiments, the CDNs served content using dedicated servers owned and operated by the CDN operator who is different from an image processing entity providing the image processing system 300 (including tiers 310-320). The image processing entity may ask the CDN operator to configure the CDN 305 as per the image processing entity's needs to serve the processed images to the clients.

In some embodiments, there the CDN 305 can also be based on a hybrid model that uses peer-to-peer (P2P) technology. In the hybrid model, content is served using both dedicated servers of the CDN operator and other peer-user-owned, for example, image processing entity, computers as applicable. However, in some embodiments, the image processing entity may also own and operate the CDN 305 entirely.

A source image storage system 330 includes original source images of the clients, such as client system 115 of FIG. 1. The image processing system 300 can obtain the original source images from the source image storage system 330 for rendering processed images. The source image storage system 330 can be owned by the client system 115, or can be a third party storage service such as a cloud storage to which the client system 115 has subscribed to for storing the original source images. The image processing system 300 may obtain the original source images from the source image storage system 330 via a communication network 325. In some embodiments, the clients can have different source image storage systems. Accordingly, the image processing system 300 may access the corresponding source storage system using the credentials provided by the corresponding client.

Referring back to the CDN 305, in some embodiments, the CDN 305 provides edge servers, such as edge server tier 205, and, in some cases, also shield servers, such as shield server tier 220, for caching the processed images around various geographical locations. The processed images (potentially multiple copies) may exist on several edge and/or shield servers. When an end user contacts the client system 115 for accessing content (which includes the processed image) published by the client system 115, the client system 115 in turn requests the CDN 305, e.g., using a CDN hostname to obtain the processed image. A domain name service (DNS) will resolve the request to an optimized CDN edge server (based on location, availability, cost, and other metrics) and that edge server will handle the request.

After a particular edge server receives the request, the process for obtaining the processed image is similar to the process described above at least with reference to FIG. 2. In some embodiments, a load balancing server tier 310 is similar to load balancing server tier 235, an image processing server tier 315 is similar to the image processing server tier 250 and source image server tier 320 is similar to the source image server tier 265. In FIG. 3, the CDN 305 and the source image storage system 330 are illustrated in dashed lines to indicate that those entities can be owned and/or operated by an entity other than the image processing entity.

Figure 4:
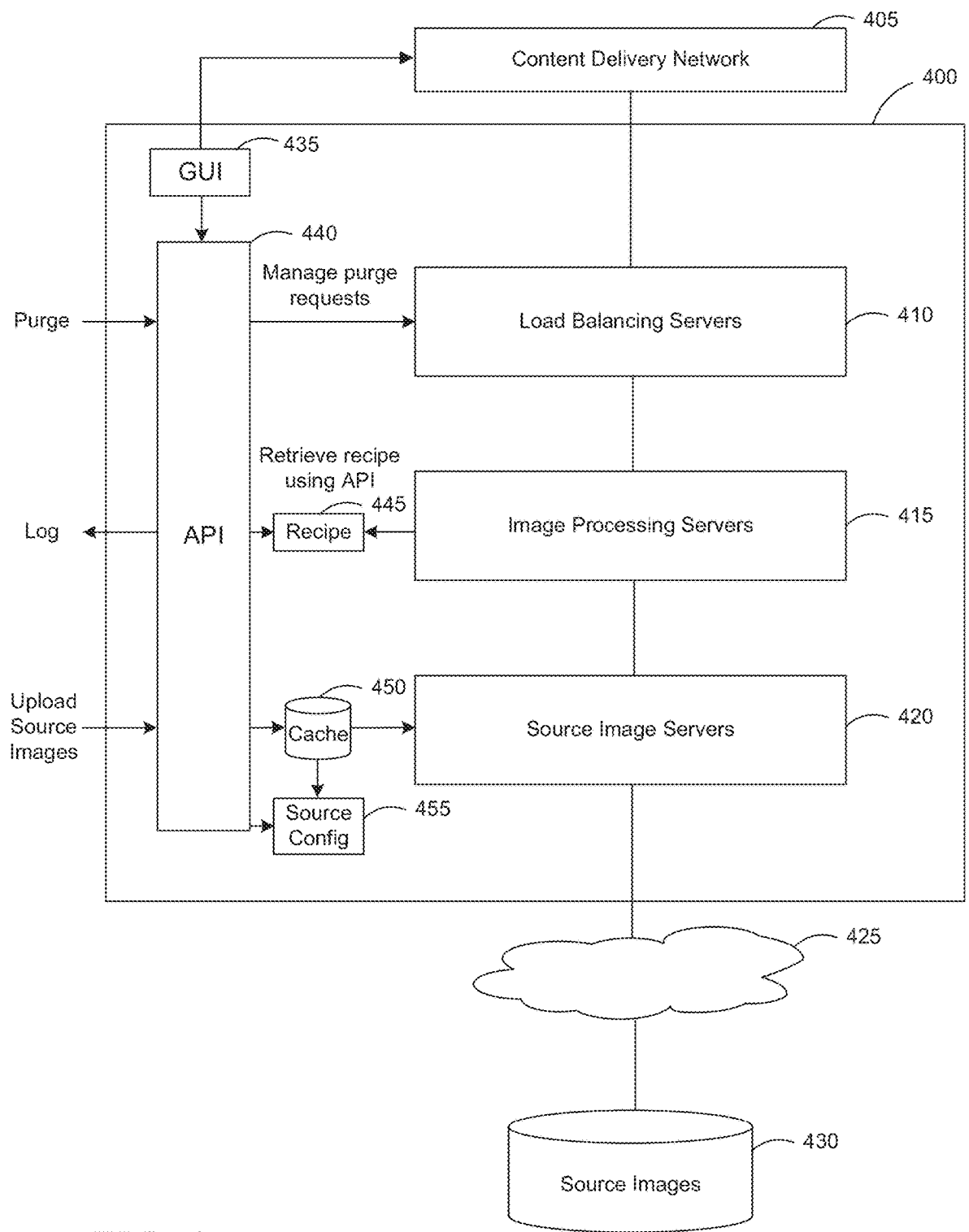
FIG. 4 is a block diagram illustrating an application programming interface (API) of an image processing system for performing various operations, consistent with various embodiments of the disclosed technology.

FIG. 4 is a block diagram illustrating an application programming interface (API) of an image processing system 400 for performing various operations, consistent with various embodiments of the disclosed technology. In some embodiments, the image processing system 400 is similar to the image processing system 300 of FIG. 3 and a load balancing server tier 410, an image processing server tier 415, a source image server tier 420 to the load balancing server tier 310, the image processing server tier 315, the source image server tier 320, respectively. In some embodiments, CDN 405, a source image storage system 430 and a communication network 425 are similar to the CDN 305, the source image storage system 330 and the communication network 325, respectively. Further, a source image server cache 455 is similar to the source image cache 270 of FIG. 2.

The image processing system 400 provides an API 440 for performing various functions of the image processing system. The API 440 includes a purge API for purging various kinds of data from a cache or other storage systems based on a predefined criterion. For example, when an original source image changes, then all the derivative images that used that original source image must immediately be purged so that they can be updated. Further, in some embodiments, items from a cache can also be evicted based on various eviction policies, e.g., least recently used policy, in order to make room for new items.

The API 440 includes APIs for generating, storing and retrieving recipes 445. The API 440 includes APIs for retrieving source configuration files 455 that contains data, including authentication data, necessary for establishing a secure connection to the source image storage system 430. The API 440 includes APIs for uploading source images to the source image storage system 430. In some embodiments, a client, such as client system 115, can use the image uploading API to upload source images to the source storage system 430. In some embodiments, the source images so uploaded can also be stored at the source image cache 450 simultaneously which helps in fast retrieval of the source image by the source image server tier 420 when asked to retrieve the source image. By storing the source image at the source image cache 450, computing resources, such as time and network bandwidth, that may be consumed for obtaining the source image from the source storage system 430 is minimized.

A graphical user interface (GUI) 435 may be provided to the clients for generating recipes 445 and providing the recipes 445 to the image processing system. In some embodiments, the GUI 435 can be integrated into the client applications that publish content to the end users. For example, the GUI 435 can be integrated into a website published by the client system 115 that contains the processed image. The client system 115 may use the GUI 435, which uses the API 440, to edit the images displayed in the website and create a recipe based on the edits performed to the image. The recipe so created can be sent to the image processing system. The GUI 435 may also issue image processing requests to the image processing system.

The API 440 also provides APIs for generating a log file such as log 280 containing various data regarding processing of the images. In some embodiments, the API 440 may use a logging system (not illustrated), e.g., real-time logging systems, to generate the log 280. The logging system can be provided by a third party.

Figure 5:
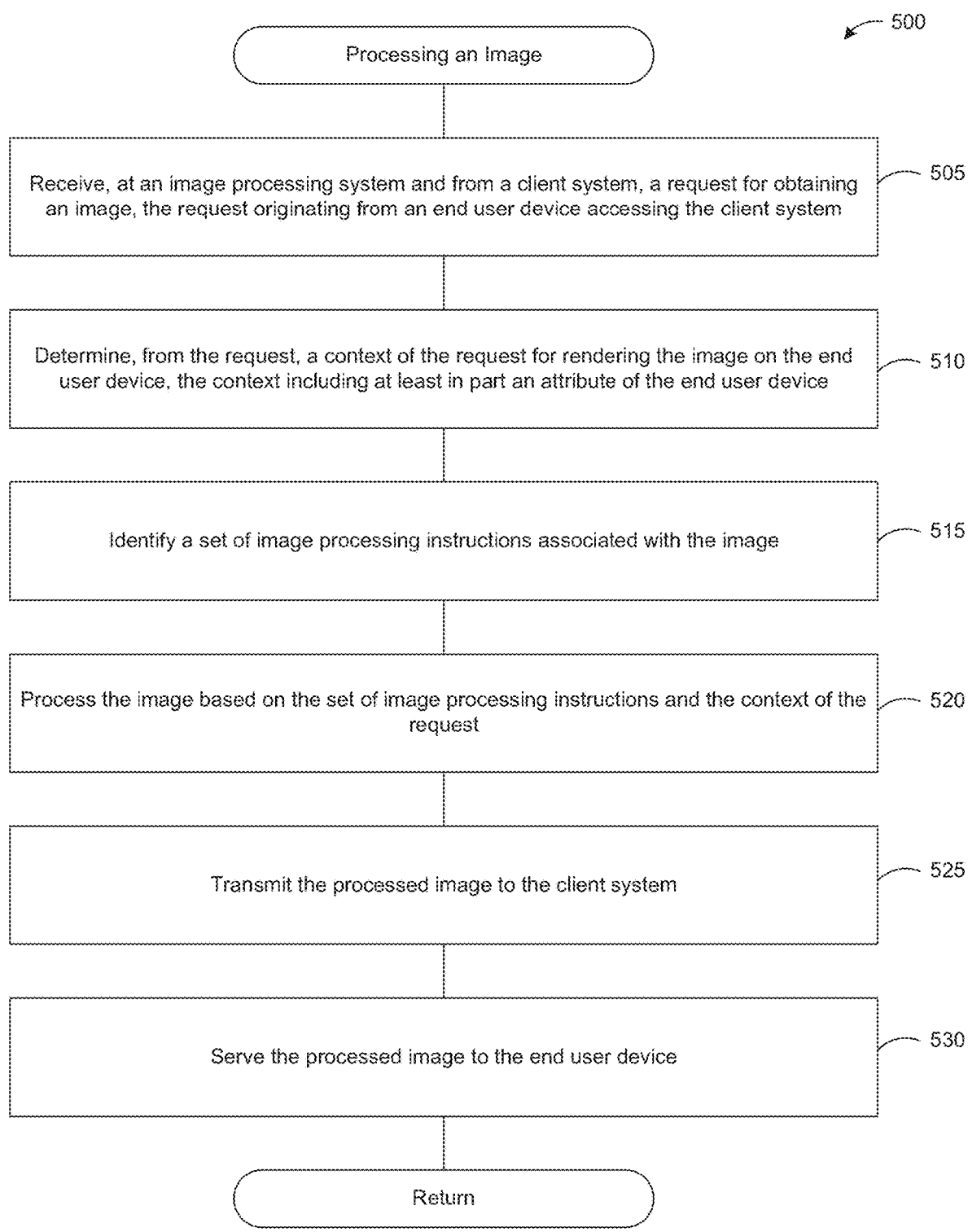
FIG. 5 is a flow diagram of a process for processing (rendering) an image using a recipe, consistent with various embodiments of the disclosed technology.

FIG. 5 is a flow diagram of a process for processing an image using a recipe, consistent with various embodiments. In some embodiments, the process 500 may be implemented in an environment such as environment 100 of FIG. 1. At step 505, an image processing system 125 receives a request from a client system, such as client system 115, for obtaining a processed image for a particular image. In some embodiments, the request can be originated from an end user device, such as end user device 105a, accessing content published by the client system 115. For example, the request can be generated when the end user device 105a accesses a URL of a website of the client system 115 having the processed image.

At step 510, the image processing system 125 determines a context of the request for rendering the image on the end user device 105a. In some embodiments, the context of the request includes at least an attribute of the end user device 105a. At step 515, the image processing system 125 identifies a recipe associated for generating the processed image. The recipe includes a set of instructions for processing the particular image. At step 520, the image processing system 125 processes the particular image based on the recipe and the context of the request to generate the processed image.

In some embodiments, processing the image includes rendering the image based on (a) a target size, (b) a target resolution, (c) a target color pattern, (d) a target layout of the image with respect to other content with which the image is served, (e) a target brightness value, (f) a target contrast value, or (g) a target saturation value. The processing can also include highlighting a target portion of the image or cropping a target area of the image, recognizing a face in the image, performing predefined image editing operations on the recognized face etc.

Further, the above processing can also be dependent on the attribute of the end user device 105a such as (a) a type of the end user device 105a, (b) a size of a display of the end user device 105a, (c) a resolution of the display of the end user device 105a, (d) an operating system of the end user device 105a, (e) ambient lighting of the end user device 105a etc. For example, if the end user device 105a has a display with a resolution higher than a predefined resolution, then the recipe can include instructions to render the image in high resolution. In another example, if the end user device 105*a* has a display with resolution lower than a predefined resolution, then the recipe can include instructions to render the image in low resolution. In another example, the brightness of the image can be changed based on the ambient lighting condition on the end user device 105*a*.

At step 525, the image processing system 125 transmits the processed image to the client system 115. At step 530, the client system 115 serves the processed image to the end user device 105*a*. For example, the processed image is served with the content in response to the end user device 105*a* accessing the URL of the website of the client system 115.

Figure 6:
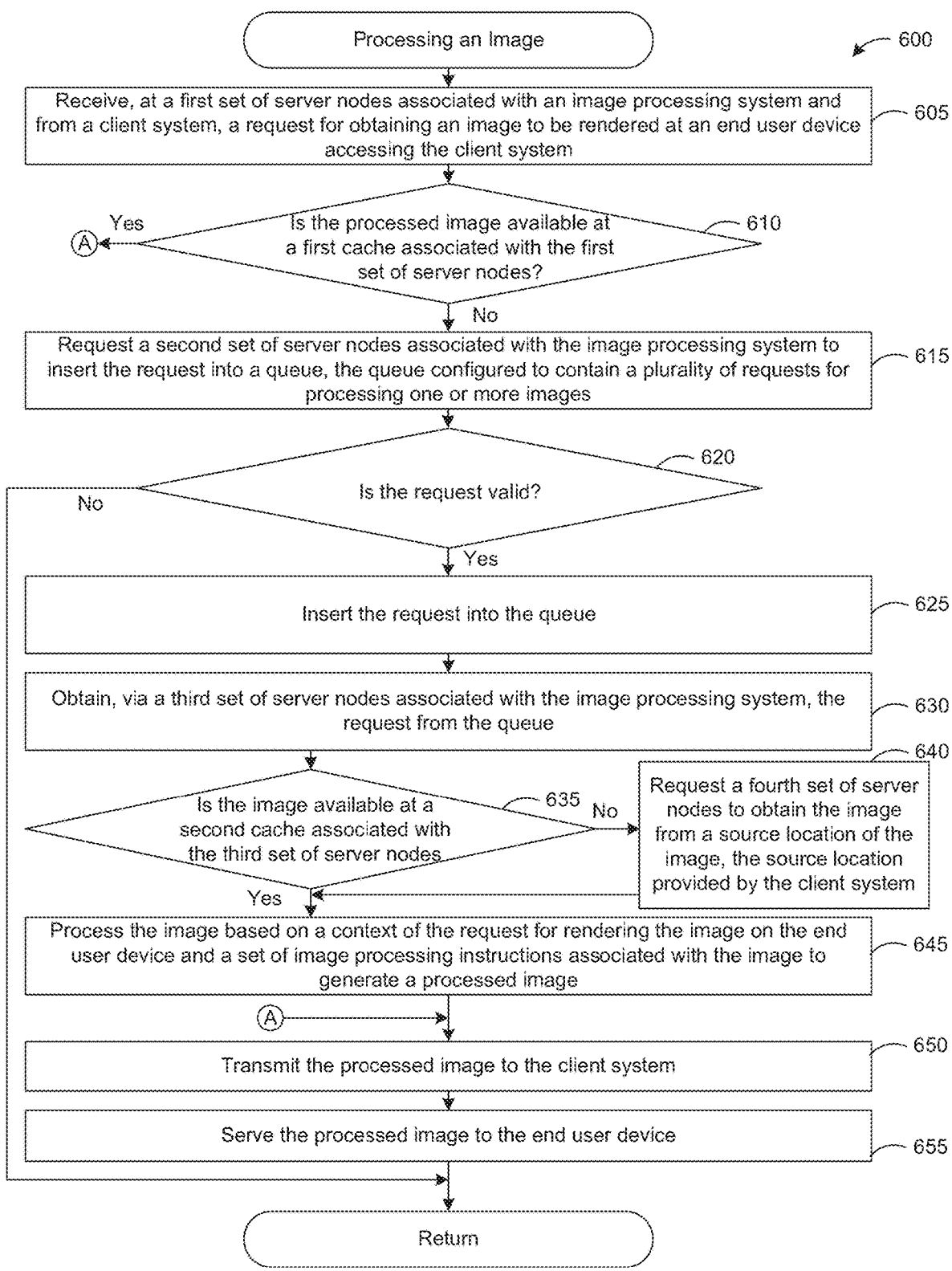
FIG. 6 is a flow diagram of another process for processing an image using a recipe in a multi-tiered image processing system, consistent with various embodiments of the disclosed technology.

FIG. 6 is a flow diagram of another process for processing an image using a recipe in a multi-tiered image processing system, consistent with various embodiments. In some embodiments, the process 600 may be implemented in an image processing system such as image processing system 200 of FIG. 2. At step 605, a first set of server nodes associated with the image processing system 200 receives a request for obtaining a processed image (of a particular image) to be rendered at an end user device, such as end user device 105*a*, accessing a client system, such as the client system 115. In some embodiments, the first set of server nodes can include one or more server tiers such as edge server tier 205 and/or shield server tier 220. In some embodiments, the first set of server nodes is the closest point of the image processing system 200 for the client system 115.

In some embodiments, the edge servers may be located in various geographical locations. The servers in the edge server tier 205 may be configured to serve requests from predefined geographical locations. The shield servers can be distributed across various geographical regions, wherein a geographical region includes a number of geographical locations. In some embodiments, the shield servers can be configured to receive requests from a group of edge servers in a particular geographical region.

At step 610, the first set of server nodes determines whether the processed image is available at a first cache associated with the first set of server nodes. In some embodiments, the edge server tier 205 has one or more associated edge server caches and if a shield server tier 220 exists, the shield server tier 220 will also have one or more associates shield server caches. At step 615, if the processed image is available at the first cache (edge server cache and/or shield server cache) associated with the first set of server nodes, the processed image is retrieved and the control is transferred to step 650 where the processed image is transmitted to the client system 115. On the other hand, responsive to a determination that the processed image is not available at the first cache, the first set of server nodes asks a second set of server nodes associated with the image processing system 200 to insert the request into a queue such as queue 240. In some embodiments, the second set of server nodes can be a load balancing server tier 235.

At step 620, the second set of server nodes determines whether the request is a valid request. In some embodiments, the validity of the request can be determined by determining whether a signature of an image for which the request is received matches with the any of the signatures maintained at the image processing system 200. If the particular request is not valid, the process 600 returns. On the other hand, if the request is valid, at step 625, the second set of server nodes inserts the request into the queue 240.

At step 630, a third set of server nodes, such as image processing server tier 250, obtains the request from the queue 240. The queue 240 can have multiple requests for processing one or more images. Further, a request can be split into multiple sub-tasks. For example, if a particular request requires face recognition and cropping, the face recognition operation and the cropping operation can be split into two tasks and added to the queue 240 as two sub-tasks. The face recognition task can be assigned to a server that performs face recognition task and the cropping task can be assigned to a server that performs the cropping operation.

After obtaining the request from the queue 240, the image processing server tier 250, determines whether the original source image for which the processed image has to be rendered is available at a cache associated with the third set of server nodes, such as the image processing server cache 260. Responsive to a determination that the original source image is not available at the image processing server cache 260, the third set of server nodes requests a fourth set of server nodes, such as source image server tier 265, to obtain the original source image. The source image server tier 265 obtains the original source image from either a cache, such as source image server cache 270, associated with the source image server tier 265 or from a location specified by the client system 115. In some embodiments, the location specified by the client system 115 can be a third party storage service such as a cloud storage service. The source image server tier 265 may obtain the original source image from the cloud storage service using the authentication credentials provided by the client system 115.

Referring back to step 635, if the original source image is available at the image processing server cache 260, the image processing server tier 250 retrieves the original source image from the image processing server cache 260 and proceeds with processing the image at step 645.

At step 645, the image processing server tier 250 processes the original source image based on the recipe and the context of the request. In some embodiments, processing the original source image includes identifying a recipe associated with the original source image and retrieving the associated recipe from a storage system, such as recipe storage system 255. The image processing server tier 250 may access the recipe using an API such as API 440 of FIG. 4.

In some embodiments, processing the original source image based on the recipe includes rendering the image based on (a) a target size, (b) a target resolution, (c) a target color pattern, (d) a target layout of the image with respect to other content with which the image is served, (e) a target brightness value, (f) a target contrast value, or (g) a target saturation value. The processing can also include highlighting a target portion of the image or cropping a target area of the image, recognizing a face in the image, performing predefined image editing operations on the recognized face etc.

Further, the above processing can also be dependent on the context of the request, which includes one or more attributes of the end user device 105*a* such as (a) a type of the end user device 105*a*, (b) a size of a display of the end user device 105*a*, (c) a resolution of the display of the end user device 105*a*, (d) an operating system of the end user device 105*a*, (e) ambient lighting of the end user device 105*a* etc. For example, if the end user device 105*a* has a display with a resolution higher than a predefined resolution, then the recipe can include instructions to render the image in high resolution. In another example, if the end user device 105*a* has a display with resolution lower than a predefined resolution, then the recipe can include instructions to render the image in low resolution. In another example, the brightness of the image can be changed based on the ambient lighting condition on the end user device 105a.

In some embodiments, the processed image rendered by the image processing server tier 250 is a derivate image. A derivative image is a kind of rendered image that depends on one or more original source images. In embodiments where the image processing server tier 250 renders a derivative image, the image processing server tier 250 may retrieve the necessary original source images from the image processing server cache 260 and/or the source image server tier 265. In some embodiments, the recipe can include the data regarding the original source images required for the recipe and may also include the locations of the original source images.

At step 650, the image processing server tier 250 transmits the processed image to the client system 115. In some embodiments, when the image processing server tier 250 returns the processed image to the client system 115, the processed image is transmitted to the client system 115 though one or more tiers, e.g., load balancing server tier 235, shield server tier 220 and edge server tier 205, above the image processing server tier 250. The one or more tiers may also store the processed image received from the image processing server tier 250 in a cache associated with the corresponding server tier.

At step 655, the client system 115 serves the processed image to the end user device 105a. For example, the processed image is served with the content in response to the end user device 105a accessing the URL of the website of the client system 115.

Figure 7:
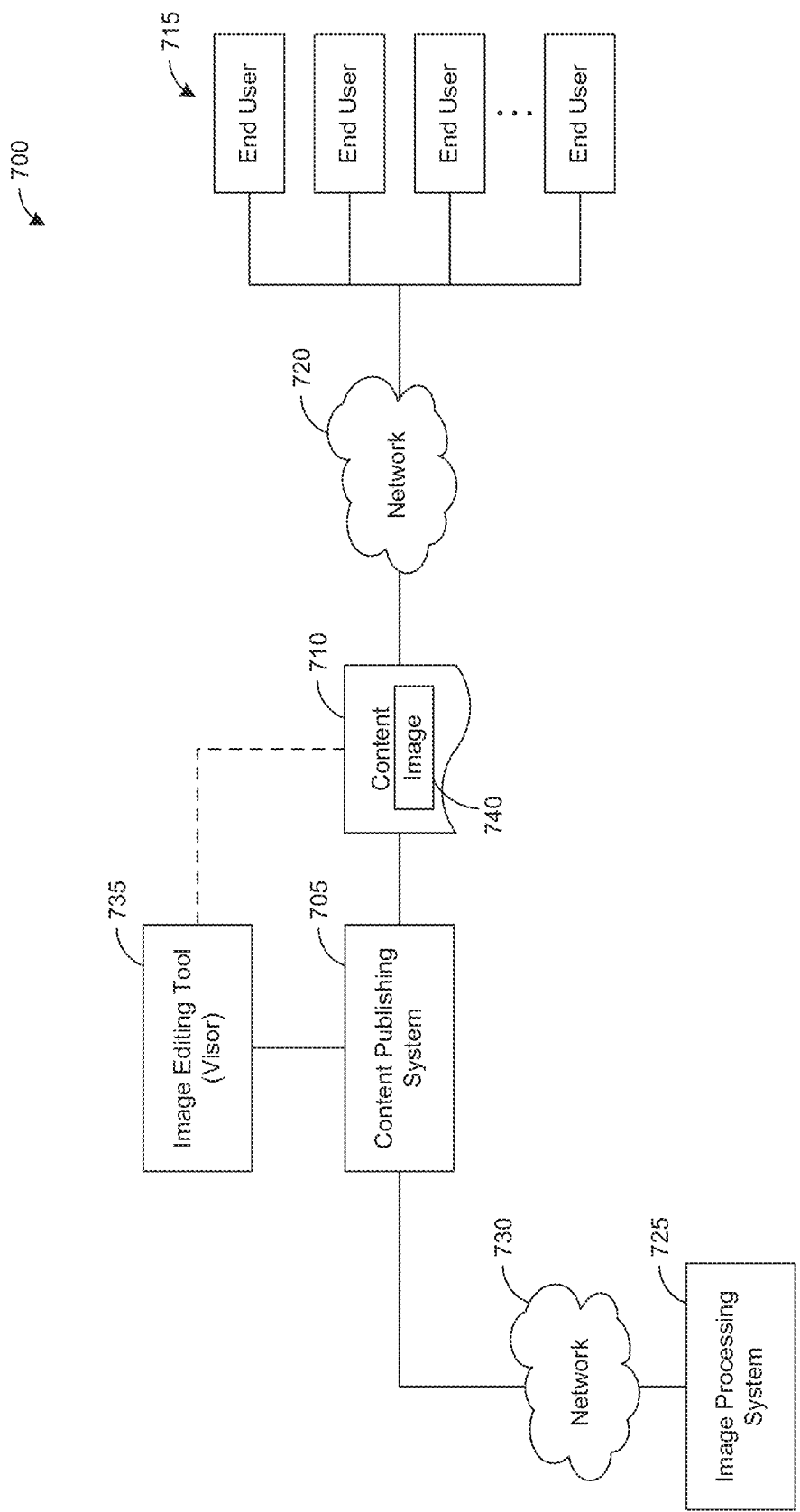
FIG. 7 illustrates an environment where an image editing tool ("visor") of an image processing system can be implemented.

FIG. 7 illustrates an environment where an image editing tool ("visor") of an image processing system can be implemented. In some embodiments, the environment 700 may be similar to the environment 100 of FIG. 1, a content publishing system 705 to the client system 115, an image processing system 725 to the image processing system 125, end users 715 to the end users 105a-c and an image editing tool 135 to the GUI 435 of FIG. 4.

The content publishing system 705 publishes an image 740, which may be accessed by one or more end users 715. The image 740 can be part of content 710 published to the end users 715. The end users 715 can access the content 710 over a communication network 720 such as Internet. The end users 715 may access the content 710 in various ways, e.g., via a web browser or an app executing on a device an end user. Further, the end users 715 can access the content 710 on a variety of devices, including a desktop computer, a laptop, a smartphone, a tablet, etc.

In the environment 700, the image 740 presented to the end users 715 is typically processed using the image processing system 725. In some embodiments, the image processing system 725 is remote from the content publishing system 705, and so, a communication network 730, such as Internet, LAN, WAN etc., can be used for connecting the image processing system 725 with the content publishing system 705.

As described at least with reference to FIG. 1 and processes 500 and/or 600, the image processing system 725 receives a request from the content publishing system 705 (e.g., on behalf of one or more end users 715) for obtaining the image 740 which is to be served to the end users 715 with the content 710. The image processing system 725 obtains a source image from a storage associated with the image processing system 725 or the content publishing system 705, e.g., caches 215, 230, 260 or 270 of FIG. 2 and/or source image storage system 120 of FIG. 1, and processes the source image based on a particular recipe to generate the image 740. The image 740 is then returned to the content publishing system 705, which further serves it to the end users 715.

The content publishing system 705 can generate a recipe for processing the image 740, for example, to generate a new processed image. The content publishing system 705 can generate recipes using an image editing tool such as the visor 735 that enables the content publishing system 705 to edit the image 740 and generate recipes based on the edits. The visor 735 includes a GUI that provides various editing controls for performing various editing operations on the image 740. After the image 740 is edited using the visor 735, the visor 735 generates a recipe corresponding to the editing operations performed by the content publishing system 705 and transmits the recipe to the image processing system 725. It should be noted that the visor 735 may not transmit the image 740 itself to the image processing system 725.

Upon receiving the recipe associated with the image 740, the image processing system 725 retrieves a copy of the image 740 from a storage system associated with the image processing system 725 or the content publishing system 705 and processes the copy of the image 740 based on the recipe to generate the processed image, as described above. The processed image is transmitted to the content publishing system 705, which further serves the processed image to the end users 715.

The visor 735 is typically provided by the entity associated with image processing system 725. However, various other image editing tools provided by third parties can also be configured in a similar way to generate a recipe that can be processed by the image processing system 725.

Figure 8:
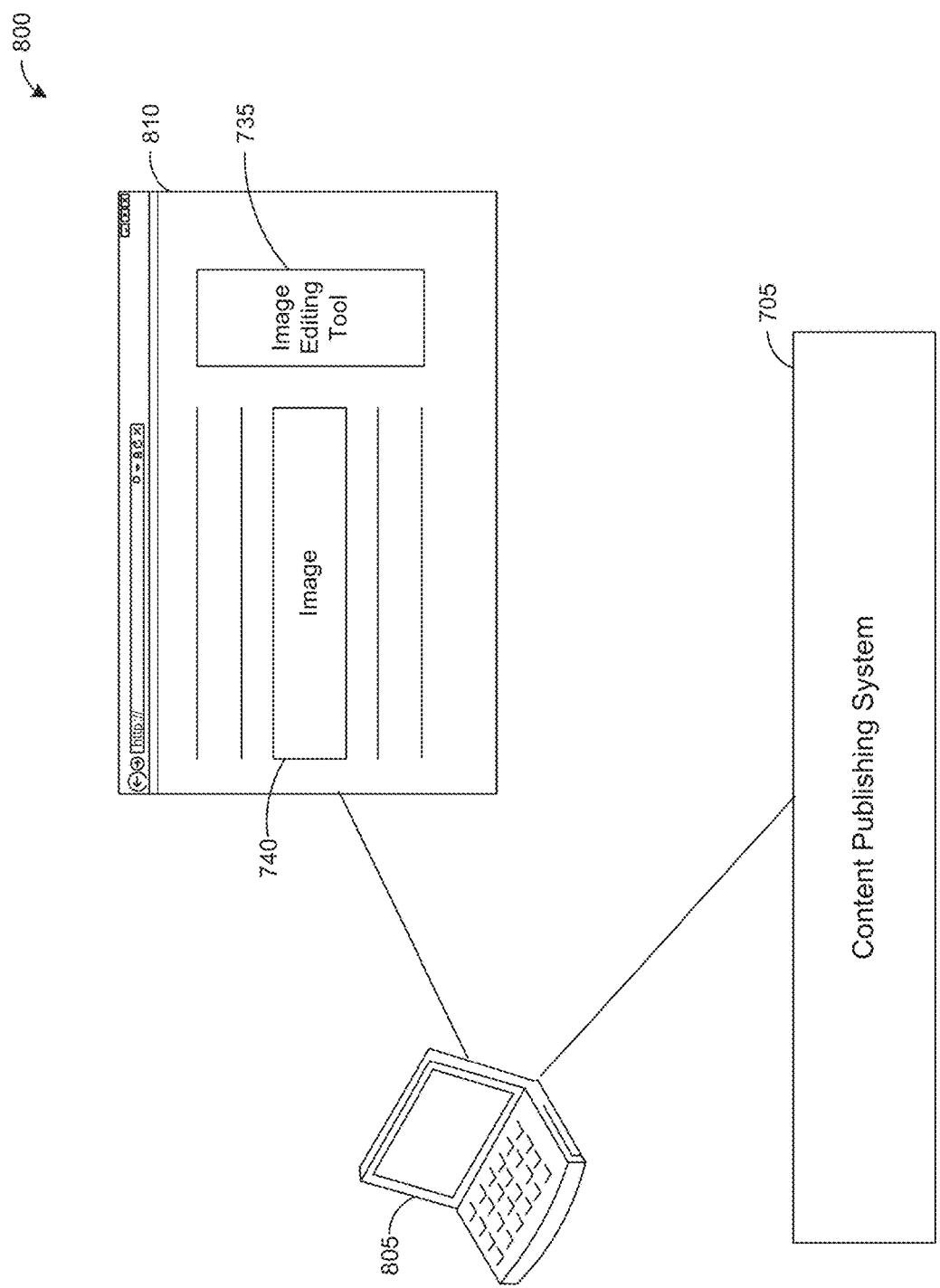
FIG. 8 is an example illustrating a visor integrated into a webpage containing content published by the content publishing system, consistent with various embodiments of the disclosed technology.

In some embodiments, the visor 735 can be integrated into a medium using which the content publishing system 705 publishes content 710 to the end users 715. For example, the visor 735 can be integrated into a webpage containing the content 710 of which the image 740 is a part, as shown in FIG. 8. In another example, the visor 735 can be integrated into an app of a smartphone, tablet, etc., through which the content is published.

FIG. 8 is an example 800 illustrating a visor integrated into a webpage containing content published by the content publishing system, consistent with various embodiments of the disclosed technology. The content publishing system 705 publishes content 710 via one or more webpages. In some embodiments, the visor 735 is integrated into the webpage that contains the image 740. Like the end users 115, a user of the content publishing system 705, such as an administrator, can access the webpage including the image 740 via a web browser 810. The administrator may access the web browser 810 on a device 805 connected to the content publishing system 705 or on an I/O device integrated with the content publishing system 705.

The administrator can access the visor 735 presented in the webpage and edit the image 740. By presenting the visor 735 on the same webpage as the image 740, the administrator can edit the image 740 and view the resulting image as it will be seen by an end user accessing the content 710. This can help the administrator in obtaining a perspective on how the edited image may look with the content 710 to an end user, before the edited image is actually published. The administrator may then decide whether or not to publish the edited image. If the administrator decides to publish the edited image, the visor 735 sends the recipe having the instructions corresponding to the edit operations performed on the image 740 to the image processing system 725.

The visor 735 can either be integrated into the webpage having the content 710 or into the web browser 810. If the visor 735 is integrated into the webpage, the visor 735 may be available on any device that can access the webpage. The administrator may not have to install additional software to access or obtain the visor 735. On the other hand, if the visor 735 is integrated into the web browser 810, the administrator may have to install a software on the device having the web browser 810, e.g., device 805, to access the visor 735. In some embodiments, the visor 735 is integrated into the webpage using a JavaScript containing the code for the visor 735. However, the visor 735 may be implemented using various other programming languages. In some embodiments, the visor 735 is integrated into the web browser 810 as a plug-in or an extension to the web browser 810.

In some embodiments, the visor 735 can be accessible by the end users 715, especially when the visor 735 is integrated into the webpage containing the content 710. The image processing system 725 can have the visor 735 authenticate a user before providing access to the user. The user may be allowed to access the visor 735 and/or edit the image 740 only if the user is authorized. In some embodiments, the image processing system 725 supports creation of user profiles of various categories. The content publish system 705 can create user profiles of various categories and set various access levels to the user profile categories. For example, a category of users may be allowed to only view the visor 735, another category of users may be allowed to edit the image 740 but not transmit the recipe to image processing system 725, another category may be allowed to perform a subset of editing operations, etc.

Figure 9:
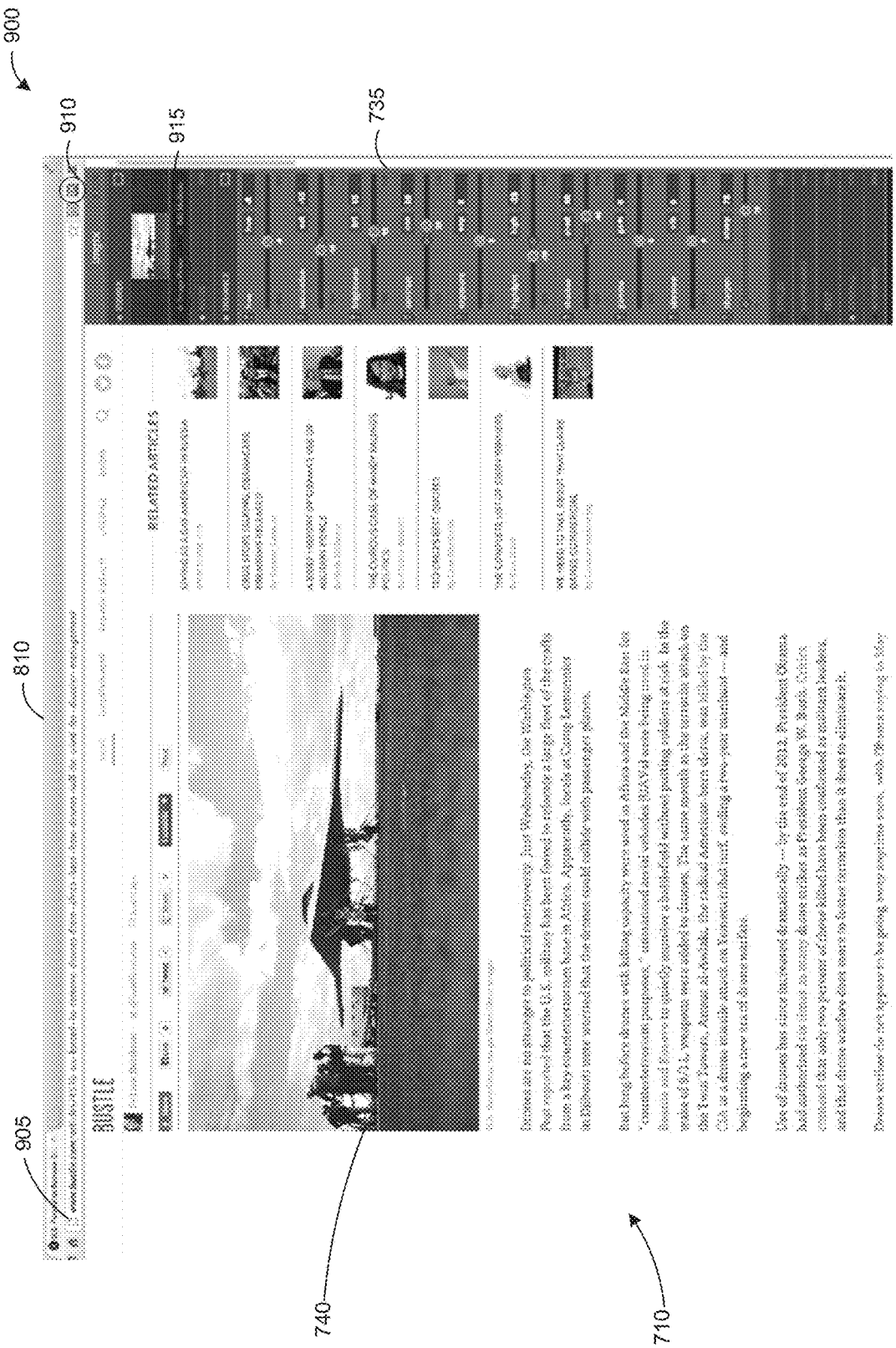
FIG. 9 is an example screenshot illustrating a visor integrated into a web browser, consistent with various embodiments of the disclosed technology.

FIG. 9 is an example screenshot 900 illustrating a visor integrated into a web browser, consistent with various embodiments of the disclosed technology. The screenshot 900 illustrates a webpage 905 displaying content 710 having the image 740, on a web browser 810. An administrator of the content publishing system 705 may access the webpage 905 using the web browser 810. The administrator may use the visor 735 to edit the image 740. The visor 735 is integrated into the web browser 810 using a plug-in (or an extension) and may be accessed using the button 910.

In the screenshot 900, the visor 735 is displayed as a sidebar in the web browser 810. However, the visor 735 may be displayed in multiple configurations, e.g., as a tool bar at the top or bottom of the web browser 810, as a menu option in the web browser 810, as a pop-up window, or anywhere in the same window as the web browser 810 displaying the content 710. The position of sidebar may also be changed, for e.g., the visor 735 may be displayed towards the left end of web browser 810.

The user, e.g., administrator, may select the image to be edited using the "image picker" button 915. The visor 735 allows editing one or more images simultaneously. While the screenshot 900 illustrates editing of a single image 740, example screenshot 1000 of FIG. 10 illustrates editing of multiple images.

Figure 10:
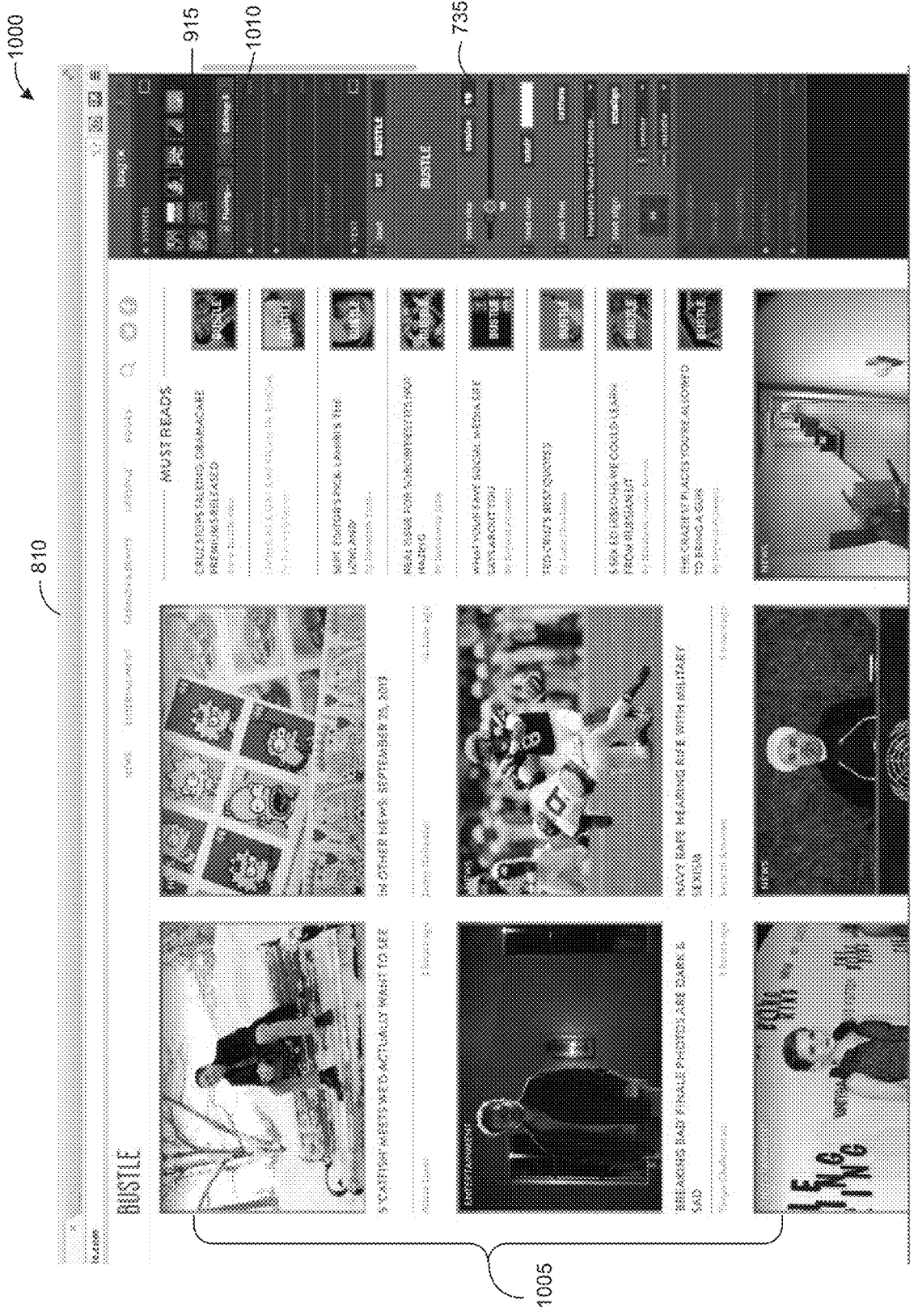
FIG. 10 is another example screenshot illustrating a visor integrated into a web browser, consistent with various embodiments of the disclosed technology.

FIG. 10 is an example screenshot 1000 illustrating a visor integrated into a web browser, consistent with various embodiments of the disclosed technology. The screenshot 1000 illustrates editing of multiple images 1005. The user, e.g., administrator, may select multiple images 1005 using the "image picker" button 915. An indicator 1010 indicates that multiple images are being edited.

It should be noted that though FIGS. 8-10 illustrate integrating the visor 735 into a webpage and/or a web browser, the integration of the visor 735 is not limited to the webpage and/or the web browser. The visor 735 can also be integrated into other mediums through which the content 710 published by the content publishing system 705 is accessible. For example, the visor 735 can be integrated into an app through which the content 710 can be accessed. The app can be executed on a variety of devices, including desktop, laptop, smartphone, tablet, etc.

Figure 11A:
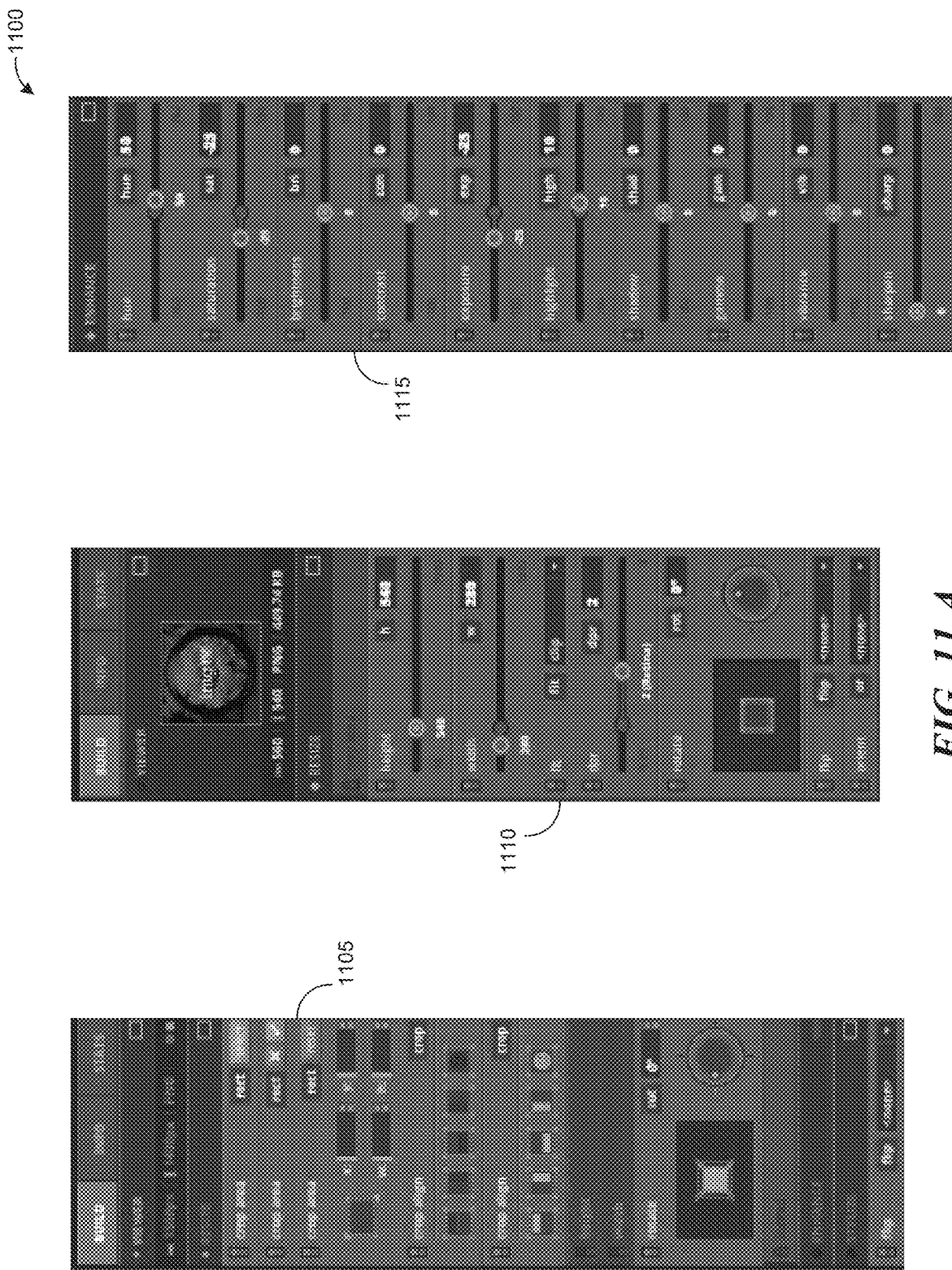
FIGS. 11A and 11B, collectively referred to as FIG. 11, are example screenshots illustrating different editing controls of a visor, consistent with various embodiments of the disclosed technology.
Figure 11B:
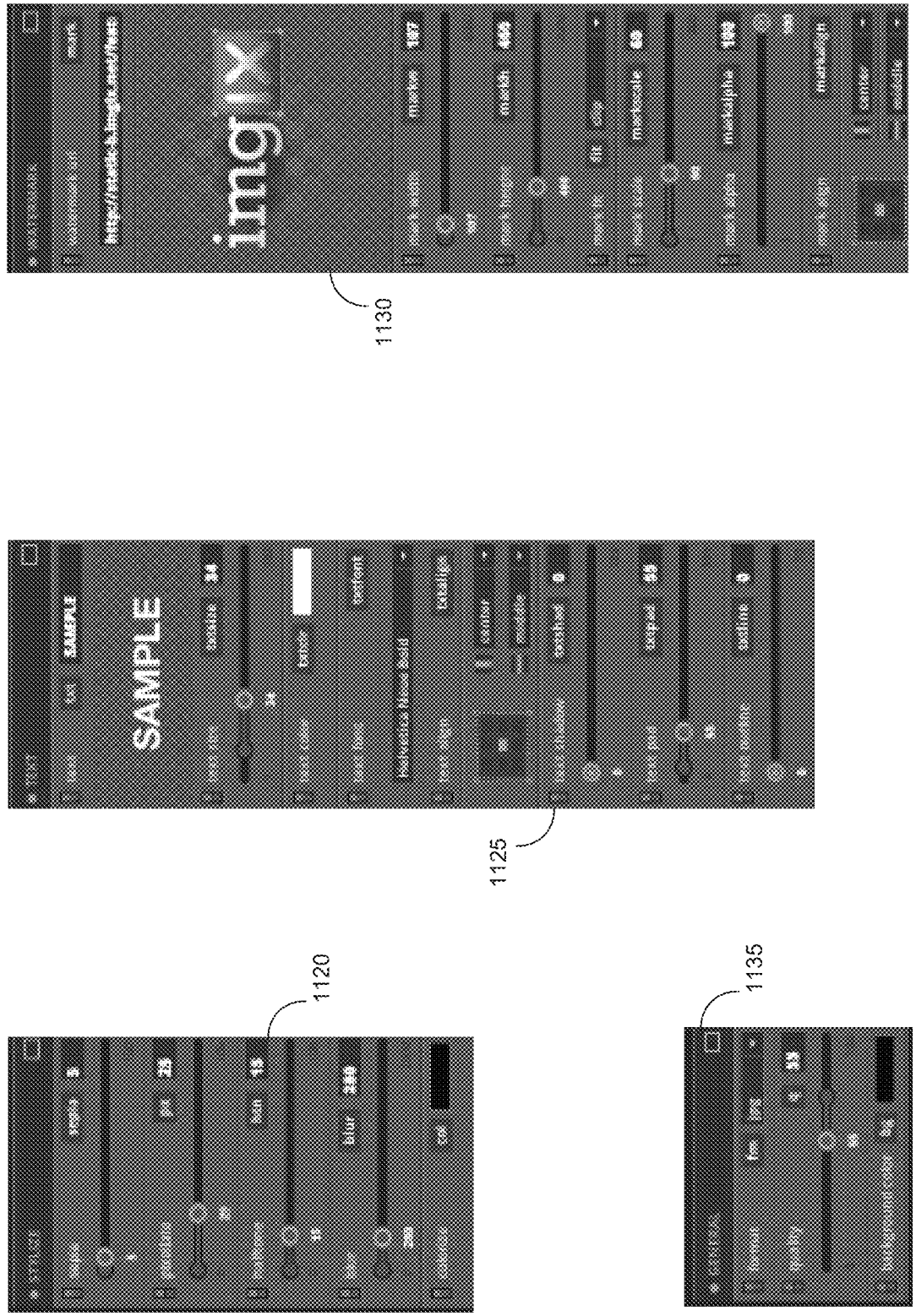

FIG. 11 is an example screenshot 1100 illustrating different editing controls of a visor, consistent with various embodiments of the disclosed technology. The screenshot 1100 illustrates various editing controls of the visor 735. The first editing control 1105 can be used to perform a set of editing operations, including cropping an image. The second editing control 1110 can be used to perform a set of editing operations, including changing height, width, orientation of an image, etc. The third editing control 1115 can be used to perform a set of editing operations, including enhancing an image by changing color, saturation, hue, contrast, etc. of the image. The fourth editing control 1120 can be used to perform a set of editing operations, including stylizing an image by adjusting image attributes such as sepia, pixels, halftone etc.

The fifth editing control 1125 can be used to perform a set of editing operations, including changing the attributes of text such as font, color, alignment etc. The sixth editing control 1130 can be used to perform a set of editing operations, including adjusting the attributes of a watermark of an image such as the watermark image location, watermark width, height, alignment etc. The seventh editing control 1135 can be used to perform a set of editing operations, including adjusting the format, e.g., jpg, bmp etc., quality of an image, background color etc.

The editing operations described above are examples only. The visor 735 may be configured to provide a number of other editing options, including editing three dimensional (3D) attributes of images. The image processing system 725 can perform 3D processing of images based on the 3D editing operations performed on the image using the visor 735.

The visor 735 can also display statistical information (not illustrated), including data related to (a) types of editing operations performed, (b) time taken by the image processing system 725 to process the image 740 based on the recipe, (c) size of the image, (d) tiers of the image processing system 725 the processing of the image had to pass through, (e) geographical location of a storage system from where a copy of the image 740 is obtained by the image processing system 725 to process the image for generating a processed image,
(f) geographical location of the image processing system 725 that processed the image 740, (g) end users who have viewed the image 740, (h) types of end user devices on which the image 740 was rendered, (i) headers of the image 740, or (j) a various metrics of processing the image 740, etc.

Figure 12:
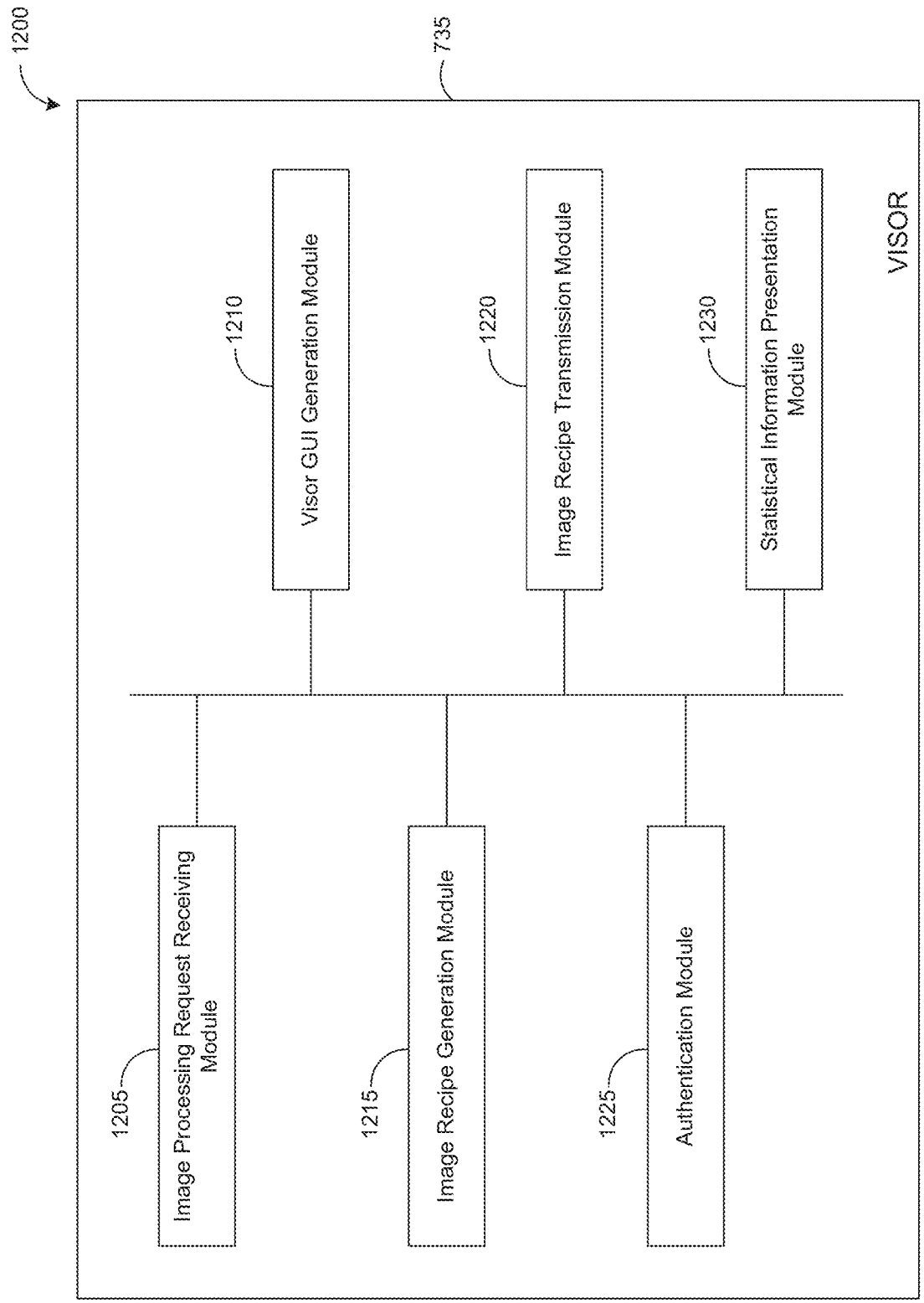
FIG. 12 is a block diagram of a system for implementing a visor, consistent with various embodiments of the disclosed technology.

FIG. 12 is a block diagram of a system 1200 for implementing a visor, consistent with various embodiments of the disclosed technology. The system 1200 can be used to generate a visor, such as visor 735 of FIG. 7, and can be used in an environment such as the environment 700. The system 1200 includes an image processing requesting receiving module 1205 that receives a request for editing an image displayed at a content publishing system 705. In some embodiments, a request for editing the image can be created by opening or executing the visor 735, for e.g., by clicking the button 910 of FIG. 9. The request can be initiated by a user, e.g., an administrator, of the content publishing system 705.

The visor GUI generation module 1210 executes the code of the visor 735 to generate and display the GUI of the visor 735 on a display. The GUI includes various editing controls, for example, editing controls described at least with reference to FIG. 11. If the visor 735 is integrated into the webpage, the visor generation module 1210 executes, for example, the JavaScript code embedded in the webpage containing the content 710 to generate the GUI in the webpage. If the visor 735 is integrated into the web browser, the visor GUI generation module 1210 executes plug-in installed in the web browser to generate the GUI. The visor GUI generation module 1210 ensures that the visor 735 is generated per the user preferences, for example, in the same window of the web browser displaying the content 710, as a pop-up window, as a sidebar, as a tool bar etc.

The system 1200 includes an image recipe generation module 1215 that generates a recipe containing a set of image processing instructions that correspond to the editing operations performed on the image by the administrator. The image recipe generation module 125 can generate the recipe in various programming languages, including Java, JavaScript, C, C++, etc.

After the recipe is generated, an image recipe transmission module 1220 transmits the recipe to the image processing system 725. The image recipe transmission module 1220 may send additional data including, an identification (ID) of the image being edited, an ID of the content publishing system 705, etc. to the image processing system 725 with the recipe. It should be noted that the image recipe transmission module does not transmit the edited image to the image processing system 725. Upon receiving the recipe from the visor 735, the image processing system 725 retrieves a copy of the image from the storage system or the cache associated with image processing system 725, processes the image to generate a processed image and transmits the image to the content publishing system 705.

The system 1200 can also include an authentication module 1225 to determine whether a user, e.g., the administrator, is authorized to perform the editing operations on the image. The authentication module 1225 allows a user to access the visor 735 and edit the image only if the user is authorized to do so. As described above at least with reference to FIG. 8, since various categories of users are provided with various levels of access to the visor 735, the authentication module 1225 ensures that a particular user is authorized to perform a particular operation.

The system 1200 also includes a statistical information presentation module 1230 that presents statistical information (not illustrated), including data related to (a) types of editing operations performed, (b) time taken by the image processing system 725 to process an image, e.g., the image 740, based on the recipe, (c) size of the image, (d) tiers of the image processing system 725 the processing of the image had to pass through, (e) geographical location of a storage system from where a copy of the image 740 is obtained by the image processing system 725 to process the image for generating a processed image,
(f) geographical location of the image processing system 725 that processed the image 740, (g) end users who have viewed the image 740, (h) types of end user devices on which the image 740 was rendered, (i) headers of the image 740, or (j) a various metrics of processing the image 740, etc.

Figure 13:
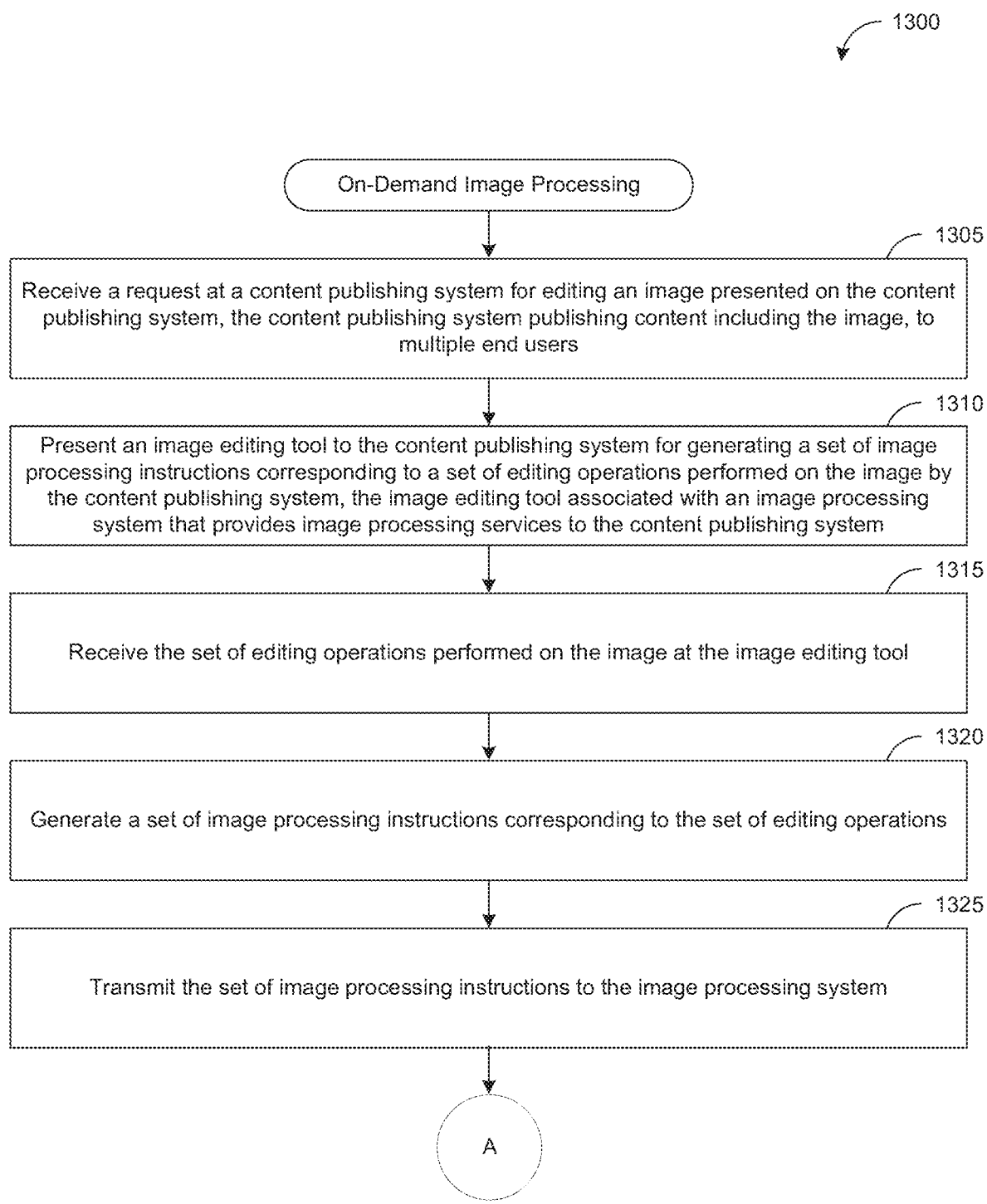
FIG. 13 is a flow diagram of a process for editing an image using a visor, consistent with various embodiments of the disclosed technology.
Figure 13:
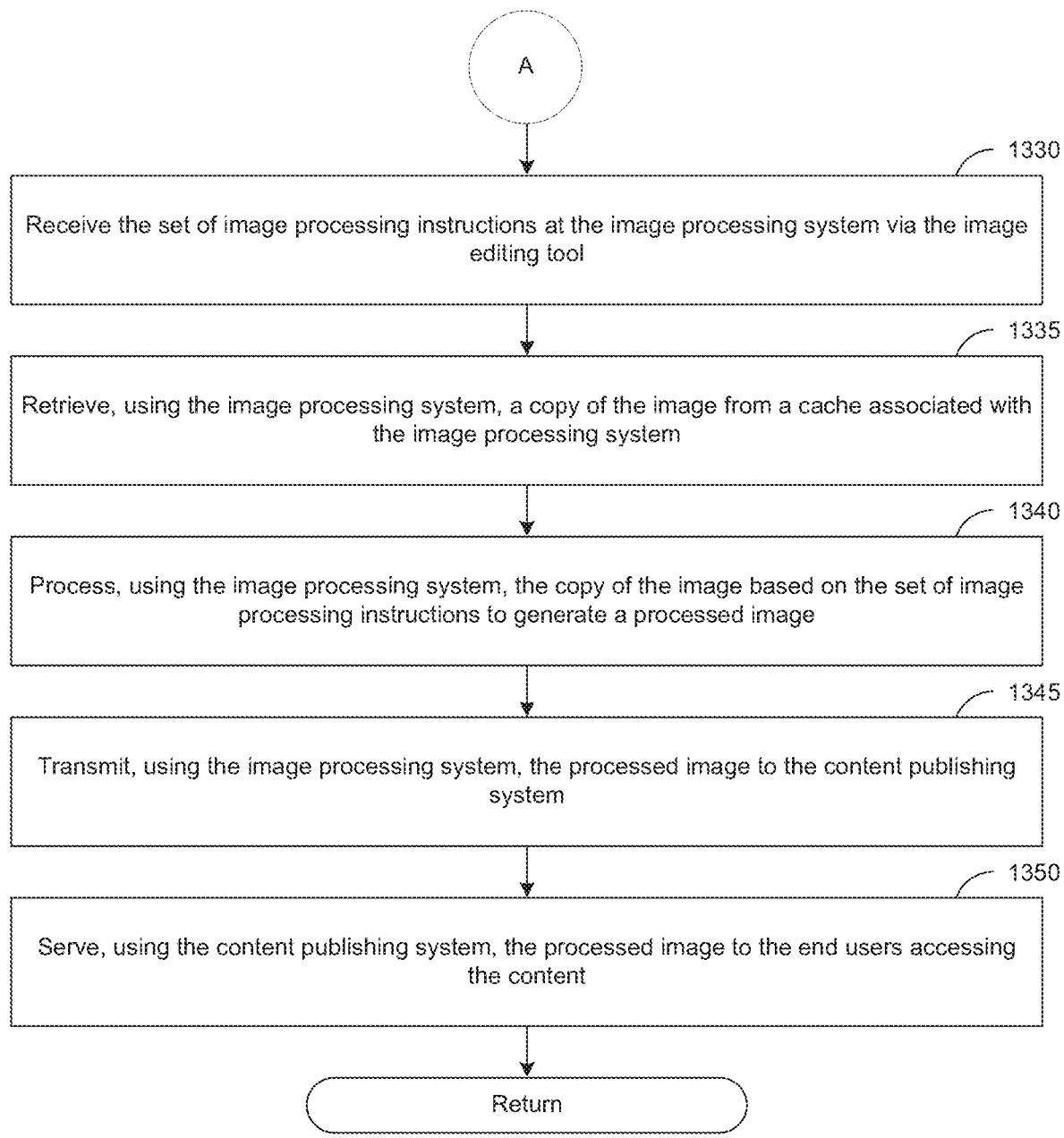

FIG. 13 is a flow diagram of a process 1300 for editing an image using a visor, consistent with various embodiments of the disclosed technology. The process 1300 can be executed in an environment 700 of FIG. 7, and using the system 1200 of FIG. 12. At block 1305, the image processing request receiving module 1205 of an image editing tool, e.g., visor 735, receives a request from a content publishing system for editing an image presented at the content publishing system. The content publishing system publishes content including the image, to multiple end users. The visor 735 is associated with an image processing system, e.g., image processing system 725, that provides image processing services to the content publishing system 705. Further, the image processing system 725 can be a remote system and can be connected with the content publishing system 705 using a communication network.

At block 1310, the visor GUI generation module 1201 presents the visor to the content publishing system. In some embodiments, presenting the visor includes generating and displaying the visor GUI on the content publishing system, e.g., on an I/O device associated with the content publishing system. The visor can be generated in the webpage containing the content, in the same window of the web browser displaying the content, as a pop-up window, as a sidebar, as a tool bar, in an app displaying the content, etc.

At block 1315, the visor 735 receives a set of editing operations performed on the image by the content publishing system. A user, e.g., an administrator of the content publishing system can perform various editing operations on the image using the GUI of the visor. In some embodiments, the editing operations can be performed on the image directly in the webpage displaying the content. The editing operations can include editing at least one of (a) a target size of the image, (b) a target resolution of the image, (c) a target color pattern of the image, (d) a target layout of the image with respect to other content with which the image is served, (e) a target brightness value, (f) a target contrast value, (g) a target saturation value, (h) a target portion of the image to be highlighted, (i) a target area of the image to be cropped, (j) a watermark of the image, or (k) three dimensional (3D) features of the image.

After the editing operations are performed, at block 1320, the image recipe generation module 1215 generates a recipe including a set of image processing instructions corresponding to the editing operations performed on the image.

At block 1325, the image recipe transmission module 1220 transmits the recipe to the image processing system. It should be noted that the visor does not transmit the edited image to the image processing system 725.

At block 1330, the image processing system 725 receives the recipe from the image transmission module 1220 of the visor. The recipe is stored at a storage, e.g., a recipe store 130 of FIG. 1.

At block 1335, the image processing system 725 retrieves a copy of the image from a cache associated with the image processing system 725. In some embodiments, the image processing system 725 can retrieve a copy of the image based on one or more of the ID of the image, the ID of the content publishing system, etc. The cache associated with the image processing system 725 can be one or more of caches 215, 230, 260 or 270 of FIG. 2.

At block 1340, the image processing system 725 processes the copy of the image based on the recipe received from the visor to generate a processed image. In some embodiments, the copy of the image may be processed using at least one of processes 500 or 600.

At block 1345, the image processing system 725 transmits the processed image to the content publishing system for further transmission to any end users accessing the content including the processed image.

At block 1350, the content publishing system serves the processed image to the end users accessing the content, and the process 1300 returns.

Figure 14:
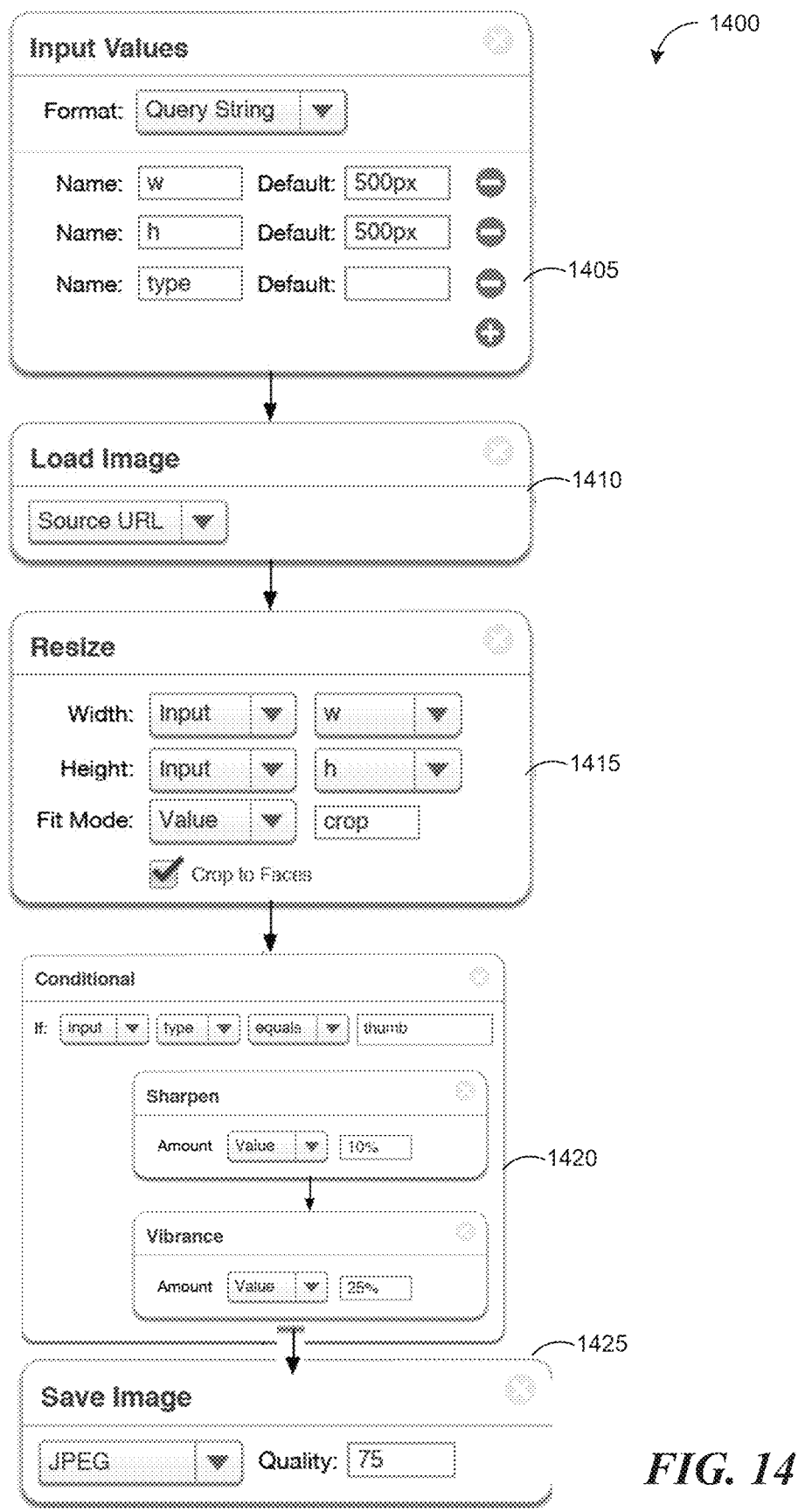
FIG. 14 is a block diagram of a node graph generated using a node graph editor, consistent with various embodiments of the disclosed technology.

FIG. 14 is a block diagram of a node graph 1400 generated using a node graph editor, consistent with various embodiments of the disclosed technology. In some embodiments, the visor 735 of FIG. 7 can also be implemented as a node graph editor to provide image processing functionalities based on node graphs. The node graph editor provides an interface for defining a node graph 1400 which is a sequence of nodes representing dynamic image processing instructions (also referred to as a "control flow graph" or "pipeline"). The editor has a set of nodes (e.g., nodes 1405-1425) that may be combined into a node graph such as node graph 1400. Each node can correspond to a lower-level image processing operation and declare a set of input values that provide the parameters for the operation. The node can represent various image processing operations, including 3D image processing operations. For example, node 1415 illustrates a node with input values for resizing the image specified at node 1410. These input values may either be defined ahead-of-time as fixed values or declared to use input values of the individual requested image from either the URL query string or HTTP header fields (node 1405).

The source URL in node 1405 can be a value calculated by combining the URL of the source origin of the image and any other user specific account configuration parameters. This value may be used an input value for one or more nodes in the graph (node 1410). When used, this value may be implicitly fetched from the origin storage, e.g., source image storage system 430 of FIG. 4, and used as an file object. The file object may be inspected for content type, and it should be an image-like object for use as an image. Other operation types may use other object types. For example, a text file object may be used for composing text on top of an image. An archive file object (such as a zip file) may be used as a container of subsequent file objects. There may be node operations for extracting individual file objects from the container, or for iterating over each file object in the container.

A node may declare a conditional set of operations as illustrated in node 1420. The node 1420 contains a sub-sequence of operations that are only applied when the conditional filter passes.

At the termination of the node graph 1400, a save operation, e.g., node 1425, is applied to indicate the output value from the node graph 1400. The save operation is a terminal operation. Thus, if a save operation is applied within the sub-sequence of a conditional operation, (assuming the condition were to pass) the node graph 1400 can terminate at the save point. The save point may result in non-image file objects where applicable. For example, a color palette may be extracted from the image and saved as a JSON dictionary or a CSS file.

Figure 15:
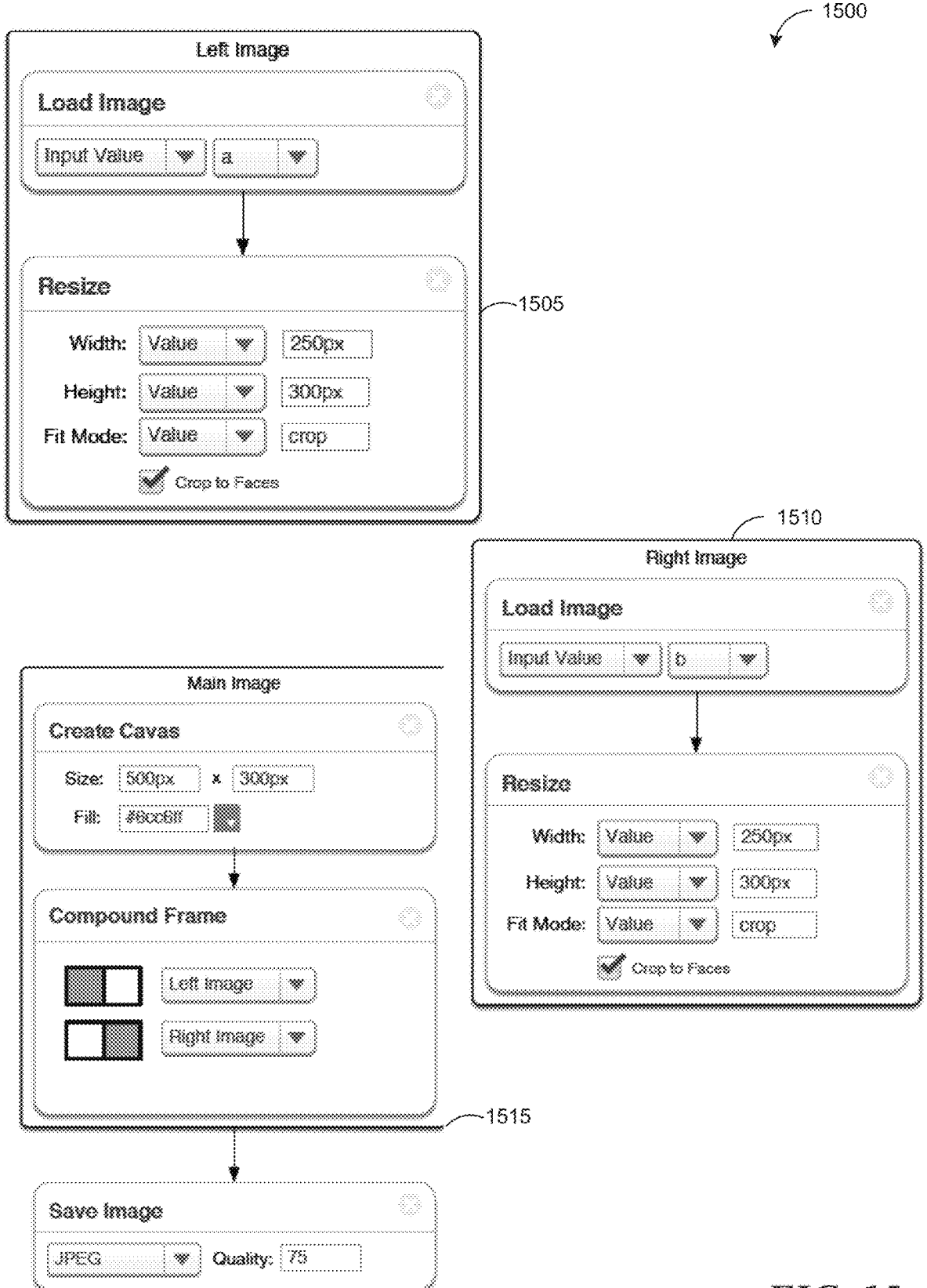
FIG. 15 is a block diagram illustrating a compound node graph, consistent with various embodiments of the disclosed technology.

FIG. 15 is a block diagram illustrating a compound node graph, consistent with various embodiments of the disclosed technology. In some embodiments, a node graph can also be a compound node graph such as node graph 1500. The user may define any number of control flow graphs. A compound node graph may be constructed from two or more distinct graphs. This may involve chaining together two or more graphs. Alternatively, one node graph may invoke a secondary (or tertiary, etc.) node graph as a step within the primary control flow.

The distinct graphs may be named for identify to be used in subsequent nodes. A compound operation may consist of a compound frame as shown in node 1515. The compound frame may provide a fixed frame of images with an input for each placement in the frame. The node graph 1500 shows two frame positions represented by nodes 1505 and 1510. However, the number of frame positions is unbounded. Also, a user may declare the structure of the frame, in which case there would be an input image for each custom placement.

Figure 16:
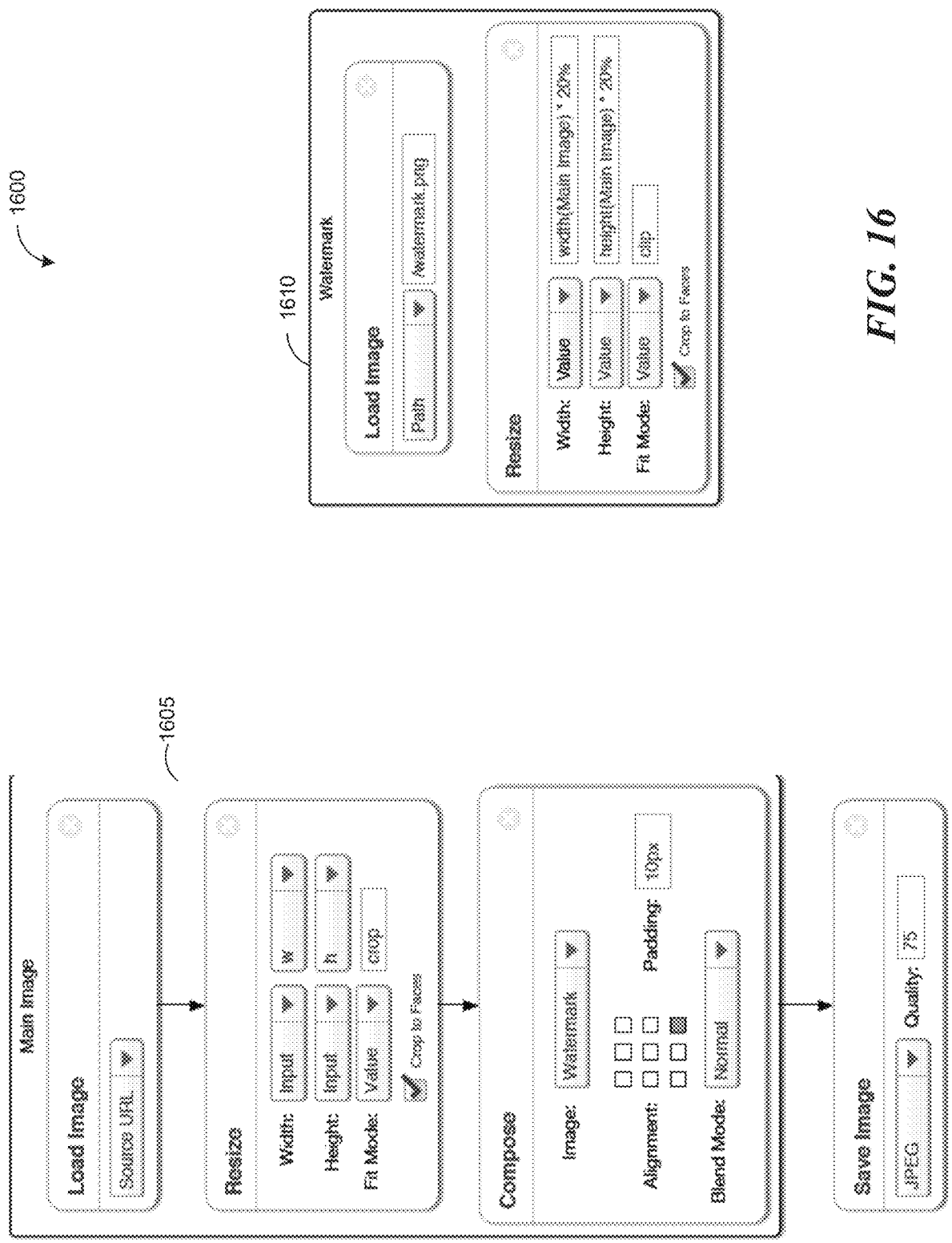
FIG. 16 is a block diagram illustrating another example of a compound node graph, consistent with various embodiments of the disclosed technology.

FIG. 16 is a block diagram illustrating another example of a compound node graph, consistent with various embodiments of the disclosed technology. Another compound operation may be a composition node graph such node graph 1600. In the example 1600, the resulting image from the secondary graph 1610 is placed using a grid to declare where on top of the primary image the secondary image should be placed as illustrated in primary graph 1605. The compose operation may also provide a blending mode for the composition. Secondary pipelines, such as secondary graph 1610, may only be invoked in a lazy manner in order to improve performance. That is, the control flow graph of secondary graph 1610 will not run if it is not used. This may be significant in a case where the secondary graph is applied within the sub-sequence of a conditional operation: the pipeline operations will only be invoked when the condition is true, and the output of the secondary operation is required.

Figure 17:
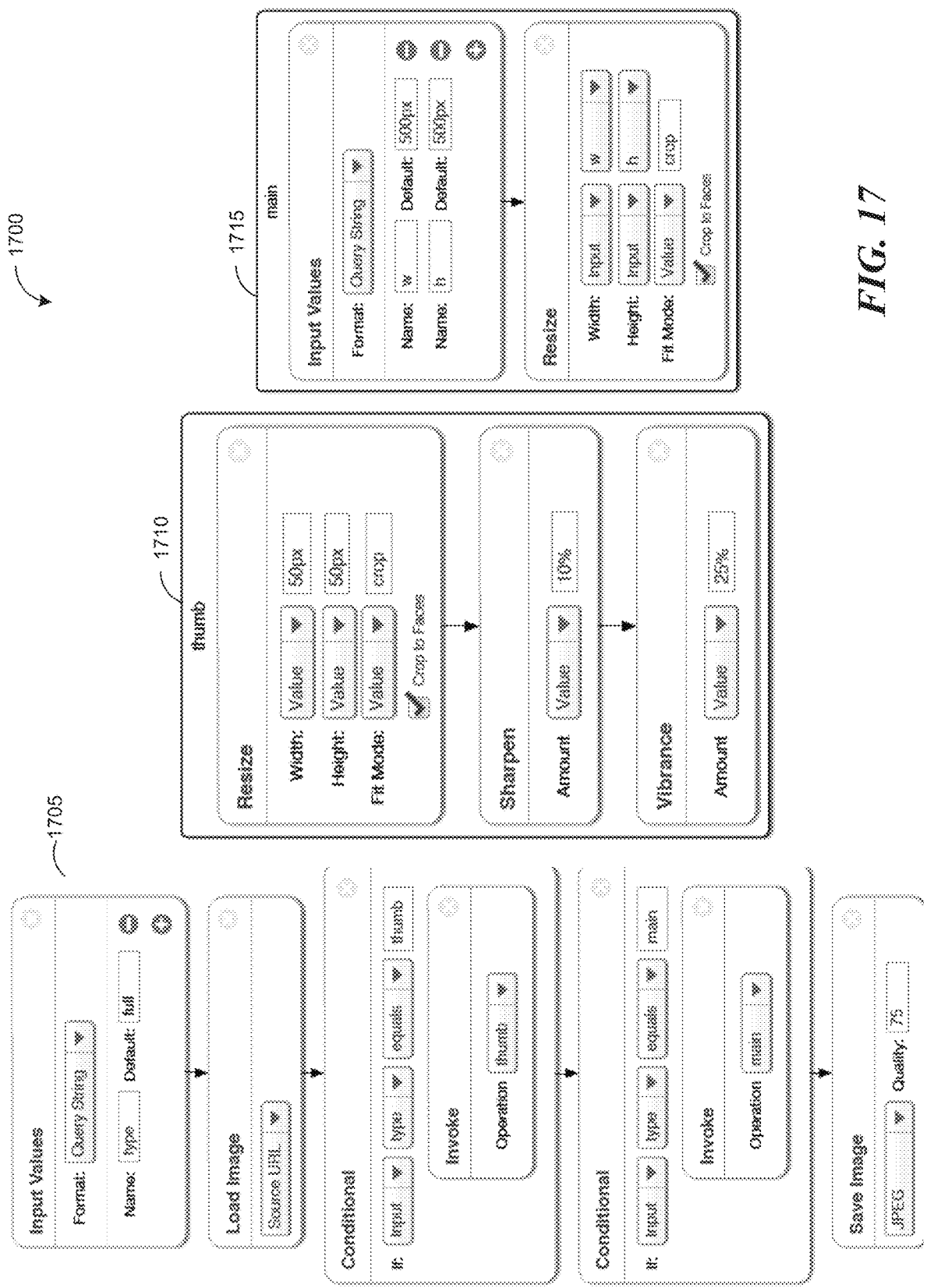
FIG. 17 is a block diagram illustrating an example of an invoke node, consistent with various embodiments of the disclosed technology.

FIG. 17 is a block diagram illustrating an example of an invoke node, consistent with various embodiments of the disclosed technology. An invoke node may be used to explicitly use the results of a secondary graph. For example, in example 1700, the invoke node of primary graph 1705 is used to use the results of the secondary graph 1710. This may be used for organizing nodes into types. In this form, the node graph may only apply zero or one of the secondary graphs, e.g., secondary graph 1710 or secondary graph 1715, based on the value of the "type" input URL query string parameter. In example 1700, if the value of "type" is "thumb" the thumb graph 1710 may be invoked, but the main graph 1715 may not. If the value of "type" is "main" the main graph 1715 may be invoked, but the thumb graph 1710 may not. For any other value, neither the thumb graph or the main graph may be invoked.

After defining the node graphs, the user, e.g., content publishing system 705 of FIG. 7, may compile the graph and send the compiled graph to the image processing system 725. The image processing system 725 processes the images using the provided node graph and serve the images to the end users 715. In some embodiments, this node graph pipeline may be compiled ahead-of-time and used in place of the default static pipeline, e.g., instructions received from the visor 735, for any number of user images requested through the image processing system 725.

The declared input parameters (e.g., URL query string and HTTP header fields) may define a restrictive set of values that advise the ability of a caching layer to serve cached content. Identity of a cached image may be determined by the declared input values used in the node graph. Thus, if any of the declared input values differ from those used in a cached image, the caching layer, e.g., caches 215, 230, 260 or 270 of FIG. 2, may simply request a new rendered image. Conversely, if a requested image uses a query string value or a header that is not declared, the caching layer may ignore the presence of the undeclared value and use a cached object having a different or missing undeclared value.

With compound graphs, the input set is a union of all the input values for the primary graph and the input values from subsequent graphs.

Figure 18:
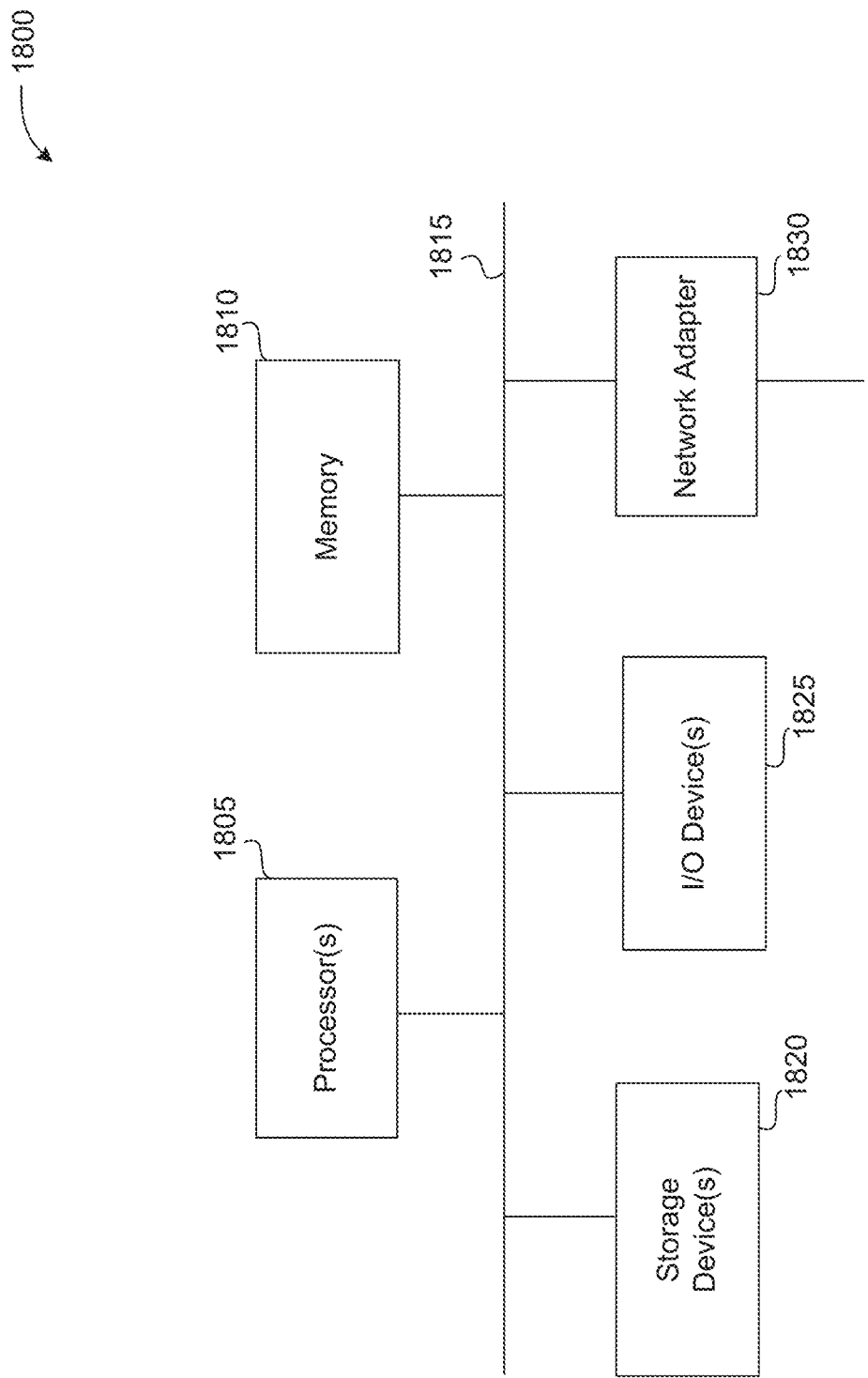
FIG. 18 is a block diagram of a computer system as may be used to implement features of some embodiments of the disclosed technology.

FIG. 18 is a block diagram of a computer system as may be used to implement features of some embodiments of the disclosed technology. The computing system 1800 may be used to implement any of the entities, components or services depicted in the examples of FIGS. 1-17 (and any other components described in this specification). The computing system 1800 may include one or more central processing units ("processors") 1805, memory 1810, input/output devices 1825 (e.g., keyboard and pointing devices, display devices), storage devices 1820 (e.g., disk drives), and network adapters 1830 (e.g., network interfaces) that are connected to an interconnect 1815. The interconnect 1815 is illustrated as an abstraction that represents any one or more separate physical buses, point to point connections, or both connected by appropriate bridges, adapters, or controllers. The interconnect 1815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1810 and storage devices 1820 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1810 can be implemented as software and/or firmware to program the processor(s) 1805 to carry out actions described above. In some embodiments, such software or firmware may be initially provided to the processing system 1800 by downloading it from a remote system through the computing system 1800 (e.g., via network adapter 1830).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
    receiving, at a client system, a request for editing an image generated in a webpage associated with the client system, wherein the client system publishes the image to an end user via the webpage;
    generating, at the client system, a recipe that includes a set of image processing instructions corresponding to multiple editing operations to be executed on the image, wherein generating the recipe includes a node graph having multiple nodes representing the multiple editing operations, wherein the multiple editing operations are executed by an image processing system if a conditional sorting feature associated with a secondary graph is satisfied, the conditional sorting feature based on a timestamp criterion or an anticipated system processor load threshold based on future execution of the multiple editing operations; and
    transmitting, by the client system, the recipe to the image processing system.

2. The computer-implemented method of claim 1 further comprising:
    receiving, at the client system from an end user device associated with the end user, a request for accessing the webpage;

transmitting, by the image processing system, a processed image to the client system; and transmitting, by the client system, the processed image to the end user device associated with the end user to be displayed on the webpage.

3. The computer-implemented method of claim 2, wherein said transmitting the processed image includes processing, by the image processing system, a copy of the image based on the recipe to generate the processed image.

4. The computer-implemented method of claim 1 further comprising:

executing, by the image processing system, the node graph to process the image, and generating a processed image based on the executing.

5. The computer-implemented method of claim 1, wherein the node graph includes a sequence of nodes, and a specified node in the sequence includes a conditional image processing operation that is to be executed on the image in an event a condition is satisfied.

6. The computer-implemented method of claim 1, wherein the node graph includes a sequence of nodes, and a specified node in the sequence includes a source location of the image.

7. The computer-implemented method of claim 1, wherein generating the node graph includes generating a compound node graph, wherein the compound node graph includes at least two distinct node graphs.

8. The computer-implemented method of claim 7, wherein generating the compound node graph includes:

generating a first node graph for a first image, generating a second node graph for a second image, and combining the first node graph and the second node graph to form the compound node graph.

9. The computer-implemented method of claim 7, wherein generating the compound node graph includes:

generating a first node graph having a first set of image processing instructions, generating a second node graph for a second image having a second set of image processing instructions, and generating an invoke node in the compound node graph, wherein the invoke node invokes at least one of the first node graph or the second node graph based on a condition specified in the compound node graph.

10. The computer-implemented method of claim 1, wherein the image processing system includes a graphical user interface (GUI) having a plurality of editing controls for executing the multiple editing operations.

11. The computer-implemented method of claim 10, wherein the editing controls enable the image to be edited directly in the webpage.

12. The computer-implemented method of claim 1, wherein the image processing system is distinct from the client system.

13. A system comprising:

a client configured to publish to an end user via a webpage, and receive a request for editing, an image generated in the webpage, the client further configured to generate a recipe that includes:

a set of image processing instructions corresponding to multiple editing operations to be executed on the image, and a node graph having multiple nodes representing the multiple editing operations; and an image processor configured to receive the recipe from the client and execute the multiple editing operations on the image if a conditional sorting feature associated with a secondary graph is satisfied, the conditional sorting feature based on a timestamp criterion or an anticipated system processor load threshold based on future execution of the multiple editing operations.

14. The system of claim 13, wherein the image processor is distinct from the client.

15. The system of claim 13, wherein the image processor is further configured to retrieve a copy of the image from a cache and process the copy of the image based on the recipe to generate a processed image.

16. The system of claim 13, wherein the image processor is further configured to execute said node graph to process the image, wherein the node graph includes a sequence of nodes, and generate a processed image based on the executing.

17. The system of claim 16, wherein the image processor is further configured to identify an input parameter of a specified node in said sequence of nodes, and execute an image processing operation corresponding to the specified node based on the input parameter to generate the processed image.

18. The system of claim 17, wherein the image processor is further configured to store the processed image in a cache, wherein the processed image is stored in association with the input parameter.

19. The system of claim 17, wherein the client is further configured to determine if an input parameter of any of multiple processed images of the image stored in a cache matches with the input parameter of the specified node, and generate the processed image in an event no match is found.

20. The system of claim 13, wherein the image processor is further configured to provide, via a graphical user interface (GUI), a plurality of editing controls for performing the multiple editing operations.

* * * * *